United States Patent
Liao et al.

(10) Patent No.: US 11,441,065 B2
(45) Date of Patent: Sep. 13, 2022

(54) COMBINATION OF A SULFONATED SURFACTANT COMPOSITION AND STAR MACROMOLECULES

(71) Applicant: Pilot Polymer Technologies, Inc., Pittsburgh, PA (US)

(72) Inventors: Yuanxi Liao, Pittsburgh, PA (US); Patrick McCarthy, Pittsburgh, PA (US); Liang Huang, Pittsburgh, PA (US); Donald Bogus, Pittsburgh, PA (US)

(73) Assignee: Pilot Polymer Technologies, Inc., Pittsburgh, PA (US)

( * ) Notice: Subject to any disclaimer, the term of this patent is extended or adjusted under 35 U.S.C. 154(b) by 507 days.

(21) Appl. No.: 16/338,864

(22) PCT Filed: Oct. 3, 2017

(86) PCT No.: PCT/US2017/054933
§ 371 (c)(1),
(2) Date: Apr. 2, 2019

(87) PCT Pub. No.: WO2018/067561
PCT Pub. Date: Apr. 12, 2018

(65) Prior Publication Data
US 2021/0284897 A1  Sep. 16, 2021

Related U.S. Application Data

(60) Provisional application No. 62/404,077, filed on Oct. 4, 2016.

(51) Int. Cl.
*C09K 8/588* (2006.01)
*C08F 293/00* (2006.01)
*C09K 8/584* (2006.01)

(52) U.S. Cl.
CPC .......... *C09K 8/588* (2013.01); *C08F 293/005* (2013.01); *C09K 8/584* (2013.01); *C08F 2438/01* (2013.01)

(58) Field of Classification Search
None
See application file for complete search history.

(56) References Cited

U.S. PATENT DOCUMENTS

2010/0273949 A1* 10/2010 Jakubowski ............. A61K 8/90
525/221
2018/0072832 A1* 3/2018 Huang ..................... C08L 33/02

FOREIGN PATENT DOCUMENTS

WO  2010123575 A1  10/2010
WO  2016004357 A1  1/2016

OTHER PUBLICATIONS

Young, Lee W.; International Search Report and Written Opinion of the International Searching Authority, issued in International App. No. PCT/US2017/054933; dated Dec. 26, 2017; 7 pages.

* cited by examiner

*Primary Examiner* — Jeffrey D Washville
(74) *Attorney, Agent, or Firm* — Ulmer & Berne, LLP

(57) ABSTRACT

The present invention relates to a composition comprising at least one sulfonated surfactant composition and one or more multi-arm star macromolecules having a core and a plurality of polymeric arms, and methods of preparing and using the same. In one aspect of the invention, this composition is capable of increasing the viscosity, and/or temperature-stability to an aqueous system.

19 Claims, 6 Drawing Sheets

COMBINATION OF A SULFONATED SURFACTANT COMPOSITION AND STAR MACROMOLECULES

CROSS-REFERENCE TO RELATED APPLICATIONS

This application is a National Stage Application under 35 U.S.C. § 371 of PCT International Application No. PCT/US2017/54933 filed Oct. 3, 2017, which claims the priority benefit of U.S. Provisional Patent App. Ser. No. 62/404,077 filed Oct. 4, 2016, each of which is incorporated herein by reference.

The following applications are also herein incorporated by reference in their entirety: U.S. application Ser. No. 12/926,143, filed Oct. 27, 2010, which is now U.S. Pat. No. 8,173,750, which is a continuation-in-part of U.S. application Ser. No. 12/799,411, filed Apr. 23, 2010, which further claims priority to U.S. Application No. 61/214,397, filed Apr. 23, 2009, U.S. application Ser. No. 12/926,780, filed Dec. 8, 2010, which is a continuation-in-part of U.S. application Ser. No. 12/653,937, filed Dec. 18, 2009, which claims priority to U.S. Application No. 61/203,387, filed Dec. 22, 2008, U.S. Application No. 61/695,103, filed Aug. 30, 2012, U.S. Application No. 61/760,210, filed Feb. 4, 2013, and U.S. Application No. 62/020,736, filed Jul. 3, 2014.

FIELD OF THE INVENTION

The present invention relates to a composition comprising at least one sulfonated surfactant composition and one or more multi-arm star macromolecules having a core and a plurality of polymeric arms, and methods of preparing and using the same.

SUMMARY OF THE INVENTION

In one aspect the invention provides a composition comprising at least one sulfonated surfactant composition and one or more star macromolecules.

In one aspect the invention provides a composition comprising at least one sulfonated surfactant composition and one or more star macromolecules having a core and a plurality of polymeric arms, wherein:
a) at least one polymeric arm of the plurality of polymeric arms is a hydrophilic polymeric arm;
b) at least one polymeric arm of the plurality of polymeric arms is a copolymeric arm, wherein at least one copolymeric arm:
  1) comprises a longer hydrophilic segment proximal to the core and a shorter hydrophobic segment distal to the core; and
  2) has a greater degree of polymerization than the at least one hydrophilic polymeric arm.

In another aspect of the invention, the sulfonated surfactant composition comprises at least one sulfonated surfactant from the following family: DOWFAX-type sulfonated surfactants, CALFAX-type sulfonated surfactants, CALSOFT-type sulfonated surfactants and Calimulse-type sulfonated surfactants.

In one aspect of the invention, there is a process of forming a mikto star macromolecule comprising:
i) creating a reaction mixture comprising a plurality of first polymeric segments having an ATRP-functional terminal group and a plurality of second monomers, wherein at least a portion of the first polymeric segments are formed by polymerizing a plurality of first monomers, non-limiting examples of first monomers include hydrophobic monomers;
ii) forming a second polymeric segment extending from said first polymeric segment by activating the ATRP-functional terminal group on said first polymeric segment to initiate polymerization of a portion of the second monomers, to form a plurality of block copolymeric arms;
iii) during the polymerization of the second monomers, introducing a plurality of second monomer initiators having an ATRP functional terminal group into the reaction mixture;
iv) activating the ATRP-functional terminal group on said second monomer initiator to initiate polymerization of a second portion of the second monomer, to form a plurality of new polymeric arms; and
v) crosslinking at least a portion of the block copolymeric arms and at least a portion of the new polymeric arms to form at least one mikto star macromolecule.

In one aspect of the invention, there is a star macromolecule polymer composition comprising one or more star macromolecules prepared by an improved, efficient arm-first living-controlled radical polymerization method, wherein the one or more star macromolecules are represented by Formula A:

$$[(P1)_{q1}-(P2)_{q2}]_r-\text{Core}-[(P3)_{q3}]_t \qquad \text{Formula A}$$

wherein:
Core represents a crosslinked polymeric segment;
P1 represents a hydrophobic polymeric segment comprised of repeat units of monomeric residues of polymerized monomers;
P2 represents a hydrophilic polymeric segment comprised of repeat units of monomeric residues of polymerized monomers;
P3 represents a hydrophilic polymeric segment comprised of repeat units of monomeric residues of polymerized monomers;
q1 represents the number of repeat units in P1 and has a value between 1 and 50;
q2 represents the number of repeat units in P2 and has a value between 30 and 2000;
q3 represents the number of repeat units in P3 and has a value between 5 and 2000;
r represents the number of block copolymeric arms covalently attached to the Core;
t represents the number of polymeric arms covalently attached to the Core; and
wherein the molar ratio of r to t is in the range of between 40:1 and 2:1.

In certain embodiments, the surfactant-system thickening macromolecule may be represented by Formula B:

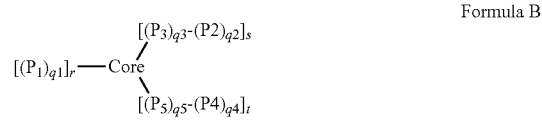

Formula B wherein:
Core represents a crosslinked polymeric segment;
P1 independently represents a polymeric segment of a first polymeric arm comprised of monomeric residues of polymerized hydrophilic monomers;
P2 independently represents a further segment of a second polymeric arm comprised of at least one monomeric residue of a polymerized hydrophobic monomer;

P3 independently represents a polymeric segment of the second polymeric arm comprised of monomeric residues of polymerized hydrophilic monomers;

P4 independently represents a polymeric segment of a third polymeric arm comprised of monomeric residues of polymerized hydrophobic monomers;

P5 independently represents a polymeric segment of the third polymeric arm comprised of monomeric residues of polymerized hydrophilic monomers;

q1 independently represents the number of monomeric residues in P1 and has a value between 5 and 2000;

q2 independently represents the number of monomeric residues in P2 and has a value between 1 and 500;

q3 independently represents the number of monomeric residues in P3 and has a value between 10 and 5000;

q4 independently represents the number of monomeric residues in P4 and has a value between 1 and 500;

q5 independently represents the number of monomeric residues in P5 and has a value between 10 and 5000;

r independently represents the number of the first polymeric arms covalently attached to the Core and has a value in the range of from 1 to 1000;

s independently represents the number of the second polymeric arms covalently attached to the Core and has a value in the range of from 1 to 1000;

t independently represents the number of the third polymeric arms covalently attached to the Core and has a value in the range of from 0 to 1000; and wherein:
the ratio of r:s, and, if t is not zero, the ratio of r:t, t:s, and r:(s+t), are independently in the range of between 40:1 and 1:40.

BRIEF DESCRIPTION OF THE FIGURES

The following figures exemplify aspects of the disclosed process but do not limit the scope of the process to the examples discussed.

DETAILED DESCRIPTION OF THE INVENTION

Figure 1:
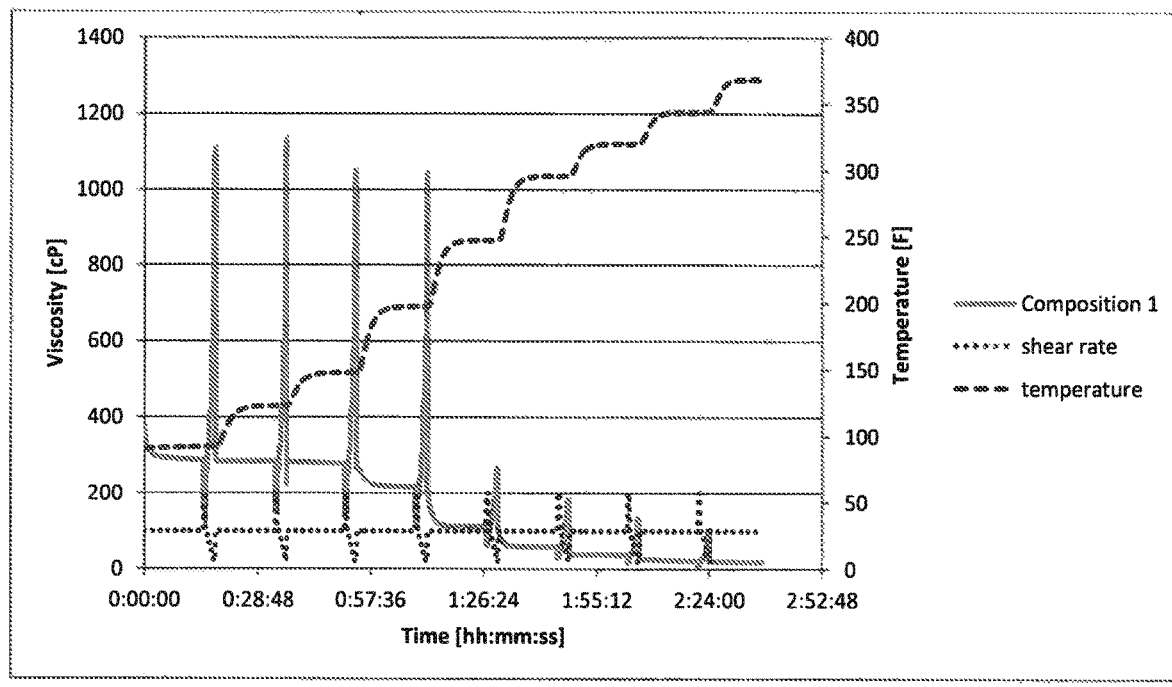
FIG. 1. Viscosity vs. shear rate and temperature of aqueous solution of composition 1. (Star macromolecule (from Example 1), DOWFAX2A1 and KCl).

The term "Star macromolecule" is understood to mean a macromolecule having a core from which linear chains (arms) emanate.

The term "core" is understood to mean a region within a star macromolecule to which polymeric arms are connected via covalent bonds.

The term "Polymeric arm" is understood to mean a composition covalently connected to a core which can be comprised of linear, block, gradient and or blocky polymeric segments.

The term "Polymeric segment" is understood to mean a region of a macromolecule that is comprised of a homopolymer and/or a copolymer.

The term "copolymer" is understood to mean a composition which results from a polymerization of two or more different monomer compounds. Copolymers can be random, statistical, alternating or gradient in composition.

The term "block copolymer" is understood to mean a polymer with two or more polymer segments with different compositions.

The term "homopolymer" is understood to mean a composition which results from a polymerization of one monomer compound.

The term "monomer residue" or "monomeric residue" is understood to mean the residue resulting from the polymerization of the corresponding monomer. For example, a polymer derived from the polymerization of an acrylic acid monomer (or derivatives thereof, such as acid protected derivatives of acrylic acid including but not limited to t-butyl ester of acrylic acid), will provide polymeric segments, identified as PAA, comprising repeat units of monomeric residues of acrylic acid, i.e., "—$CH(CO_2H)CH_2$—". For example, a polymer derived from the polymerization of styrene monomers will provide polymeric segments, identified as PSt, comprising repeat units of monomeric residues of styrene, i.e., "—$CH(C_6H_5)CH_2$—." For example, a polymer derived from the polymerization of monomeric divinylbenzene monomers will provide polymeric segments comprising repeat units of monomeric residues of divinylbenzene, i.e., "—$CH_2CH(C_6H_5)CHCH_2$—."

The term "Hydrophilic" is understood to mean a composition which when 5 wt % is dissolved in a medium which is substantially water is soluble.

The term "Hydrophobic" is understood to mean a composition which when 5 wt % is dissolved in a medium which is substantially water is substantially not soluble.

The term "Bottomhole static temperature", abbreviated as BHST, is understood to mean the temperature of the undisturbed formation at the final depth in a well. The formation cools during drilling and most of the cooling dissipates after about 24 hours of static conditions, although it is theoretically impossible for the temperature to return to undisturbed conditions. This temperature is measured under static conditions after sufficient time has elapsed to negate any effects from circulating fluids. Tables, charts and computer routines are used to predict BHST as functions of depth, geographic area and various time functions. The BHST is generally higher than the bottomhole circulating temperature, and can be an important factor when using temperature-sensitive tools or treatments.

The term "Hydraulic fracturing" or "hydrofracturing" or "hydrofracking" or "fracking" or "fraccing" is understood to mean a well-stimulation technique in which rock is fractured by a pressurized liquid. The process involves the high-pressure injection of hydraulic fracturing fluid (primarily water, containing sand or other proppants suspended with the aid of thickening agents) into a wellbore to create cracks in the deep-rock formations through which natural gas, petroleum, and brine will flow more freely. When the hydraulic pressure is removed from the well, small grains of hydraulic fracturing proppants (either sand or aluminium oxide) hold the fractures open. Hydraulic fracturing began as an experiment in 1947, and the first commercially successful application followed in 1950. As of 2012, 2.5 million "frac jobs" had been performed worldwide on oil and gas wells; over one million of those within the US. Such treatment is generally necessary to achieve adequate flow rates in shale gas, tight gas, tight oil, and coal seam gas wells. Some hydraulic fractures can form naturally in certain veins or dikes. Hydraulic fracturing involves a stimulation treatment routinely performed on oil and gas wells in low-permeability reservoirs. Specially engineered fluids are pumped at high pressure and rate into the reservoir interval to be treated, causing a vertical fracture to open. The wings of the fracture extend away from the wellbore in opposing directions according to the natural stresses within the formation. Proppant, such as grains of sand of a particular size, is mixed with the treatment fluid to keep the fracture open when the treatment is complete. Hydraulic fracturing creates high-conductivity communication with a large area of formation and bypasses any damage that may exist in the near-wellbore area.

The term "fluid" is understood to mean substance of formulation able to flow.

The term "gel" is understood to mean a jellylike substance.

The term "Carrier fluid" is understood to mean a fluid that is used to transport materials into or out of the wellbore. Carrier fluids typically are designed according to three main criteria: the ability to efficiently transport the necessary material (such as pack sand during a gravel pack), the ability to separate or release the materials at the correct time or place, and compatibility with other wellbore fluids while being nondamaging to exposed formations.

The term "Fracturing fluid" is understood to mean a fluid injected into a well as part of a stimulation operation. Fracturing fluids for shale reservoirs usually contain water, proppant, and a small amount of nonaqueous fluids designed to reduce friction pressure while pumping the fluid into the wellbore. These fluids typically include gels, friction reducers, crosslinkers, breakers and surfactants similar to household cosmetics and cleaning products; these additives are selected for their capability to improve the results of the stimulation operation and the productivity of the well.

The term "Drilling fluid" is understood to mean any of a number of liquid and gaseous fluids and mixtures of fluids and solids (as solid suspensions, mixtures and emulsions of liquids, gases and solids) used in operations to drill boreholes into the earth. Synonymous with "drilling mud" in general usage, although some prefer to reserve the term "drilling fluid" for more sophisticated and well-defined "muds." Classification of drilling fluids has been attempted in many ways, often producing more confusion than insight. One classification scheme, given here, is based only on the mud composition by singling out the component that clearly defines the function and performance of the fluid: (1) water-base, (2) non-water-base and (3) gaseous (pneumatic). Each category has a variety of subcategories that overlap each other considerably.

The term "surfactant" is understood to mean a chemical that preferentially adsorbs at an interface, lowering the surface tension or interfacial tension between fluids or between a fluid and a solid. This term encompasses a multitude of materials that function as emulsifiers, dispersants, oil-wetters, water-wetters, foamers and defoamers. The type of surfactant behavior depends on the structural groups on the molecule (or mixture of molecules).

The term "Surfactant flood" is understood to mean an enhanced oil recovery process in which a small amount of surfactant is added to an aqueous fluid injected to sweep the reservoir. The presence of surfactant reduces the interfacial tension between the oil and water phases and also alters the wettability of the reservoir rock to improve oil recovery.

The term "Waterflooding" is understood to mean an enhanced oil recovery technique using water viscosified with soluble polymers. Viscosity is increased until the mobility of the injectant is less than that of the oil phase in place, so the mobility ratio is less than unity. This condition maximizes oil-recovery sweep efficiency, creating a smooth flood front without viscous fingering. Polymer flooding is also applied to heterogeneous reservoirs; the viscous injectant flows along high-permeability layers, decreasing the flow rates within them and enhancing sweep of zones with lower permeabilities.

The term "Surfactant-polymer flooding" is understood to mean a chemical enhanced oil recovery flood that uses two sources of surfactant and a polymer. Alkaline chemicals such as sodium carbonate react with acidic oil components in situ to create petroleum soap, which is one of the surfactants. A synthetic surfactant is injected simultaneously with the alkali. A water-soluble polymer is also injected, both in mixture with the alkali and surfactant and as a slug following the mixture, to increase the viscosity of the injectant, thereby improving mobility control of the flood fronts.

The term "proppant" is understood to mean a solid material, typically sand, treated sand or man-made ceramic materials, designed to keep an induced hydraulic fracture open, during or following a fracturing treatment. It is added to a fracking fluid which may vary in composition depending on the type of fracturing used, and can be gel, foam or slickwater-based. In addition, there may be unconventional fracking fluids. Fluids make tradeoffs in such material properties as viscosity, where more viscous fluids can carry more concentrated proppant; the energy or pressure demands to maintain a certain flux pump rate (flow velocity) that will conduct the proppant appropriately; pH, various rheological factors, among others. In addition, fluids may be used in low-volume well stimulation of high-permeability sandstone wells (20 k to 80 k gallons per well) to the high-volume operations such as shale gas and tight gas that use millions of gallons of water per well.

The term "Breaker" is understood to mean chemicals used to reduce the viscosity of fracturing fluids.

The term "Seawater" is understood to mean water from a sea or ocean. On average, seawater in the world's oceans has a salinity of about 3.5% (35 g/L, or 600 mM).

The term "Well stimulation" is understood to mean a well intervention performed on an oil or gas well to increase production by improving the flow of hydrocarbons from the drainage area into the well bore.

The term "Flow back agent" is understood to mean a chemical that increases hydrocarbon production from a well. Proposed mechanisms include the flow back agent reduces water blockage effects, reduces surface tension and interfacial tension of oil and gas and results in wells with improved production post stimulation.

The term "sulfonated surfactant composition" is understood to mean a composition comprising at least one anionic surfactant and/or an amphoteric surfactant containing at least one sulfonic acid moiety, or a salt thereof (i.e., at least one sulfonate moiety), which are referred to herein as an anionic sulfonated surfactant and an amphoteric sulfonated surfactant, respectively. For example, the sulfonated surfactant composition may be, or contain, an anionic sulfonated surfactant or an amphoteric sulfonated surfactant, or mixtures thereof. For example, the sulfonated surfactant composition may be, or contain, an anionic monosulfonated surfactant or an anionic disulfonated surfactant, or mixtures thereof. The sulfonated surfactant composition, for example, may be, or contain, an amphoteric monosulfonated surfactant or an amphoteric disulfonated surfactant, or mixtures thereof. The anionic sulfonated surfactant or amphoteric sulfonated surfactant contained within the sulfonated surfactant composition may comprise 1, 2, or 3 aromatic moieties, such as a phenyl moiety, which may be independently substituted with one or more sulfonic acid moieties, or salts thereof, and may be further independently substituted with one or more linear or branched $C_4$-$C_{24}$ alkyl groups. In those instances where the anionic sulfonated surfactant or amphoteric sulfonated surfactant contained within the sulfonated surfactant composition comprises multiple aromatic moieties, the aromatic moieties may be directly attached to each other (such as a biphenyl group) or fused to each other (such as a naphthyl group), or may be linked to each other via an ether linkage (such as diphenyl ether) or a glycol moiety. For example, the sulfonated surfactant composition may be, or may comprise mixtures of, a mono- or di-alkyl diphenyl sulfonate (such as represented by Formula I), a mono- or di-alkyl diphenyl disulfonate (such as represented by Formula II), a mono- or di-alkyl diphenyl ether disulfonate (sometimes referred to as alkyldiphenyloxide disulfonate) (such as represented by Formula III), or an alkylbenzene sulfonate (such as represented by Formula IV).

In certain embodiment, sulfonated surfactant composition may be, or may comprise mixtures of, an anionic sulfonated surfactant represented by Formula I, Formula II, Formula III, or Formula IV:

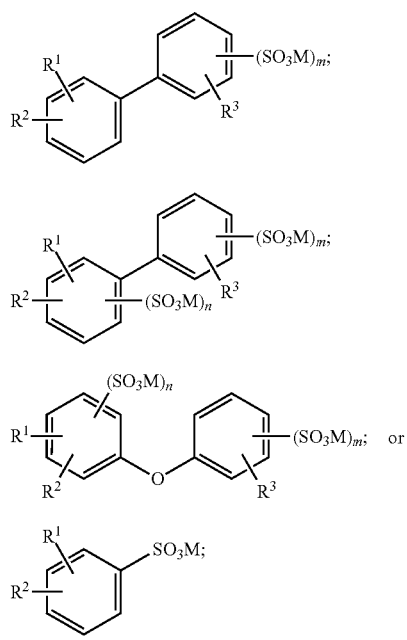

Formula I

Formula II

Formula III

Formula IV wherein:
R¹—represents a hydrogen, or a linear or branched $C_6$-$C_{24}$ alkyl;
R²—represents a hydrogen, or a linear or branched $C_6$-$C_{24}$ alkyl;
R³—represents a hydrogen, or a linear or branched $C_6$-$C_{24}$ alkyl;

M—represents an alkali metal, an ammonium represented by $N(R^4)_4$, or an aminoalcohol, or $SO_3M$ is $SO_3H$; wherein $R^4$ independently represents a hydrogen, or a linear or branched $C_3$-$C_6$ alkyl;
m—represents an integer of 1 or 2; and
n—represents an integer of 0 or 1; and
wherein at least one and no more than two of $R^1$, $R^2$, and $R^3$, represents a linear or branched $C_6$-$C_{24}$ alkyl.

The one or more linear or branched $C_4$-$C_{24}$ alkyl groups of the anionic sulfonated surfactant (for example, as represented by Formula I, Formula II, Formula III, or Formula IV) or the amphoteric sulfonated surfactant contained within the sulfonated surfactant composition may be, or may comprise mixtures of, a linear or branched $C_4$-$C_8$ alkyl, a $C_6$-$C_{10}$ alkyl, a $C_8$-$C_{14}$ alkyl, a $C_{12}$-$C_{16}$ alkyl, a $C_{14}$-$C_{18}$ alkyl, a $C_{16}$-$C_{20}$ alkyl, and/or a $C_{18}$-$C_{24}$ alkyl. For example, in certain embodiments, the groups $R^1$, $R^2$, and/or $R^3$, of the anionic sulfonated surfactant represented by Formula I, Formula II, Formula III, or Formula IV, contained within the sulfonated surfactant composition may represent a linear or branched $C_6$-$C_{24}$ alkyl, such as a linear or branched $C_4$-$C_8$ alkyl, a linear or branched $C_6$-$C_{10}$ alkyl, a linear or branched $C_8$-$C_{14}$ alkyl, a linear or branched $C_{12}$-$C_{16}$ alkyl, a linear or branched $C_{14}$-$C_{18}$ alkyl, a linear or branched $C_{16}$-$C_{20}$ alkyl, and/or a linear or branched $C_{18}$-$C_{24}$ alkyl, or mixtures thereof. In certain embodiments, the groups $R^1$, $R^2$, and/or $R^3$, of the anionic sulfonated surfactant represented by Formula I, Formula II, Formula III, or Formula IV, contained within the sulfonated surfactant composition may represent a linear $C_6$-$C_{24}$ alkyl, such as a linear $C_4$-$C_8$ alkyl, a linear $C_6$-$C_{10}$ alkyl, a linear $C_8$-$C_{14}$ alkyl, a linear $C_{12}$-$C_{16}$ alkyl, a linear $C_{14}$-$C_{18}$ alkyl, a linear $C_{16}$-$C_{20}$ alkyl, and/or a linear $C_{18}$-$C_{24}$ alkyl, or mixtures thereof. In certain embodiments, the groups $R^1$, $R^2$, and/or $R^3$, of the anionic sulfonated surfactant represented by Formula I, Formula II, Formula III, or Formula IV, contained within the sulfonated surfactant composition may represent a branched $C_6$-$C_{24}$ alkyl, such as a branched $C_4$-$C_8$ alkyl, a branched $C_6$-$C_{10}$ alkyl, a branched $C_8$-$C_{14}$ alkyl, a branched $C_{12}$-$C_{16}$ alkyl, a branched $C_{14}$-$C_{18}$ alkyl, a branched $C_{16}$-$C_{20}$ alkyl, and/or a branched $C_{18}$-$C_{24}$ alkyl, or mixtures thereof. The salt of the at least one sulfonic acid moiety of the anionic sulfonated surfactant (for example, wherein at least one of the moieties represented by $SO_3M$ is not $SO_3H$) or the amphoteric sulfonated surfactant contained within the sulfonated surfactant composition may be an alkali metal salt (such as a sodium salt (e.g., wherein M is Na) or potassium salt (e.g., wherein M is K)), an ammonium salt (e.g., wherein M represents $N(R^4)_4$), or an aminoalcohol salt.

In certain embodiments, the sulfonated surfactant composition may comprise or consist of at least 2 wt. % of an anionic monosulfonated surfactant, an anionic disulfonated surfactant, or mixtures thereof (for example, an anionic sulfonated surfactant represented by Formula I, Formula II, Formula III, or Formula IV, wherein the sum (m+n) is 1 or 2, respectively). For example, in certain embodiments, the sulfonated surfactant composition may comprise or consist of at least 5 wt. % of an anionic monosulfonated surfactant (e.g., an anionic sulfonated surfactant represented by Formula I wherein m is 1, Formula II wherein the sum (m+n) is 1, Formula III wherein the sum (m+n) is 1, or Formula IV), an anionic disulfonated surfactant (e.g., an anionic sulfonated surfactant represented by Formula I wherein m is 2, Formula II wherein the sum (m+n) is 2, or Formula III wherein the sum (m+n) is 2), or mixtures thereof, such as comprise or consist of at least 10 wt. %, 15 wt. %, 20 wt. %, 40 wt. %, 50 wt. %, 75 wt. %, 90 wt. %, or at least 95 wt.

%, or is 100 wt. % of an anionic monosulfonated surfactant, an anionic disulfonated surfactant, or mixtures thereof.

In certain embodiments, the sulfonated surfactant composition may comprises at least 2 wt. % of an amphoteric monosulfonated surfactant, an amphoteric disulfonated surfactant, or mixtures thereof. For example, in certain embodiments, the sulfonated surfactant composition may comprise or consist of at least 5 wt. % of an amphoteric monosulfonated surfactant, an amphoteric disulfonated surfactant, or mixtures thereof, such as comprise or consist of at least 10 wt. %, 15 wt. %, 20 wt. %, 40 wt. %, 50 wt. %, 75 wt. %, 90 wt. %, or at least 95 wt. %, or is 100 wt. % of an amphoteric monosulfonated surfactant, an amphoteric disulfonated surfactant, or mixtures thereof.

In certain embodiments, the sulfonated surfactant composition may comprises at least 2 wt. % of an anionic sulfonated surfactant comprising or consisting of a linear or branched mono- or di-alkyl diphenyl sulfonate (such as represented by Formula I, wherein (i) $R^1$ represents a linear or branched $C_6$-$C_{24}$ alkyl, and $R^2$ and $R^3$ represent hydrogen, or (ii) each of $R^1$ and $R^2$ or $R^1$ and $R^3$ represent a linear or branched $C_6$-$C_{24}$ alkyl, and $R^2$ or $R^3$ represents hydrogen, respectively), or mixtures thereof. For example, in certain embodiments, the sulfonated surfactant composition may comprise at least 5 wt. % of an anionic sulfonated surfactant comprising or consisting of a linear or branched mono- or di-alkyl diphenyl sulfonate, or mixtures thereof, such as comprise at least 10 wt. %, 15 wt. %, 20 wt. %, 40 wt. %, 50 wt. %, 75 wt. %, 90 wt. %, or at least 95 wt. %, or is 100 wt. % of an anionic sulfonated surfactant comprising or consisting of a linear or branched mono- or di-alkyl diphenyl sulfonate, or mixtures thereof, wherein the linear or branched alkyl group of the mono- or di-alkyl diphenyl sulfonate (e.g. (i) $R^1$ group or (ii) each of $R^1$ and $R^2$ or $R^1$ and $R^3$ groups, respectively) may be a linear or branched $C_4$-$C_8$ alkyl, a $C_6$-$C_{10}$ alkyl, a $C_8$-$C_{14}$ alkyl, a $C_{12}$-$C_{16}$ alkyl, a $C_{14}$-$C_{18}$ alkyl, a $C_{16}$-$C_{20}$ alkyl, and/or a $C_{18}$-$C_{24}$ alkyl, or mixtures thereof, and wherein the salt of said linear or branched mono- or di-alkyl diphenyl sulfonate (for example, wherein at least one of the moieties represented by $SO_3M$ is not $SO_3H$) may be an alkali metal salt (such as a sodium salt (e.g., wherein M is Na) or potassium salt (e.g., wherein M is K)), an ammonium salt (e.g., wherein M represents $N(R^4)_4$), or an aminoalcohol salt. In certain embodiments, the sulfonated surfactant composition may comprise at least 5 wt. % of an anionic sulfonated surfactant comprising or consisting of a linear or branched mono- or di-alkylated anionic sulfonated surfactant represented by Formula I, wherein (i) $R^1$ represents a linear or branched $C_6$ alkyl, and $R^2$ and $R^3$ represent hydrogen, or (ii) each of $R^1$ and $R^2$ or $R^1$ and $R^3$ represent a linear or branched $C_6$ alkyl, and $R^2$ or $R^3$ represent hydrogens, respectively (e.g., a "linear or branched mono- or di-hexyl diphenyl sulfonate"), such as comprise at least 10 wt. %, 15 wt. %, 20 wt. %, 40 wt. %, 50 wt. %, 75 wt. %, 90 wt. %, or at least 95 wt. %, or is 100 wt. % of an anionic sulfonated surfactant comprising or consisting of a linear or branched mono- or di-hexyl diphenyl sulfonate, or mixtures thereof, wherein M of said linear or branched mono- or di-hexyl diphenyl sulfonate may represent an alkali metal, such as M represents Na. In certain embodiments, the sulfonated surfactant composition may comprise at least 5 wt. % of an anionic sulfonated surfactant comprising or consisting of a linear or branched mono- or di-alkylated anionic sulfonated surfactant represented by Formula I, wherein (i) $R^1$ represents a linear or branched $C_{12}$ alkyl, and $R^2$ and $R^3$ represent hydrogen, or (ii) each of $R^1$ and $R^2$ or $R^1$ and $R^3$ represent a linear or branched $C_{12}$ alkyl, and $R^2$ or $R^3$ represents hydrogen, respectively (e.g., a "linear or branched mono- or di-dodecyl diphenyl sulfonate"), such as comprise at least 10 wt. %, 15 wt. %, 20 wt. %, 40 wt. %, 50 wt. %, 75 wt. %, 90 wt. %, or at least 95 wt. %, or is 100 wt. % of an anionic sulfonated surfactant comprising or consisting of a linear or branched mono- or di-dodecyl diphenyl sulfonate, or mixtures thereof, wherein M of said linear or branched mono- or di-dodecyl diphenyl sulfonate may represent an alkali metal, such as M represents Na.

In certain embodiments, the sulfonated surfactant composition may comprise at least 2 wt. % of an anionic sulfonated surfactant comprising or consisting of a linear or branched mono- or di-alkyl diphenyl disulfonate (such as represented by Formula II, wherein the sum (m+n) is 2, and wherein (i) $R^1$ represents a linear or branched $C_6$-$C_{24}$ alkyl, and $R^2$ and $R^3$ represent hydrogen, or (ii) each of $R^1$ and $R^2$ or $R^1$ and $R^3$ represent a linear or branched $C_6$-$C_{24}$ alkyl, and $R^2$ or $R^3$ represents hydrogen, respectively), or mixtures thereof. For example, in certain embodiments, the sulfonated surfactant composition may comprise at least 5 wt. % of an anionic sulfonated surfactant comprising or consisting of a linear or branched mono- or di-alkyl diphenyl disulfonate, or mixtures thereof, such as comprise at least 10 wt. %, 15 wt. %, 20 wt. %, 40 wt. %, 50 wt. %, 75 wt. %, 90 wt. %, or at least 95 wt. %, or is 100 wt. % of an anionic sulfonated surfactant comprising or consisting of a linear or branched mono- or di-alkyl diphenyl disulfonate, or mixtures thereof, wherein the linear or branched alkyl group of the mono- or di-alkyl diphenyl disulfonate (e.g. (i) $R^1$ group or (ii) each of $R^1$ and $R^2$ or $R^1$ and $R^3$ groups, respectively) may be a linear or branched $C_4$-$C_8$ alkyl, a $C_6$-$C_{10}$ alkyl, a $C_5$-$C_{14}$ alkyl, a $C_{12}$-$C_{16}$ alkyl, a $C_{14}$-$C_{18}$ alkyl, a $C_{16}$-$C_{20}$ alkyl, and/or a $C_{18}$-$C_{24}$ alkyl, or mixtures thereof, and wherein the salt of said mono- or di-alkyl diphenyl disulfonate (for example, wherein the sum (m+n) is 2, and wherein at least one of the moieties represented by $SO_3M$ is not $SO_3H$) may be an alkali metal salt (such as a sodium salt (e.g., wherein M is Na) or potassium salt (e.g., wherein M is K)), an ammonium salt (e.g., wherein M represents $N(R^4)_4$), or an aminoalcohol salt. In certain embodiments, the sulfonated surfactant composition may comprise at least 5 wt. % of an anionic sulfonated surfactant comprising or consisting of a linear or branched mono- or di-alkylated anionic sulfonated surfactant represented by Formula II, wherein (i) $R^1$ represents a linear or branched $C_6$ alkyl, and $R^2$ and $R^3$ represent hydrogen, or (ii) each of $R^1$ and $R^2$ or $R^1$ and $R^3$ represent a linear or branched $C_6$ alkyl, and $R^2$ or $R^3$ represents hydrogen, respectively (e.g., a "linear or branched mono- or di-hexyl diphenyl disulfonate"), such as comprise at least 10 wt. %, 15 wt. %, 20 wt. %, 40 wt. %, 50 wt. %, 75 wt. %, 90 wt. %, or at least 95 wt. %, or is 100 wt. % of an anionic sulfonated surfactant comprising or consisting of a linear or branched mono- or di-hexyl diphenyl disulfonate, or mixtures thereof, wherein M of said linear or branched mono- or di-hexyl diphenyl disulfonate may represent an alkali metal, such as M represents Na. In certain embodiments, the sulfonated surfactant composition may comprise at least 5 wt. % of an anionic sulfonated surfactant comprising or consisting of a linear or branched mono- or di-alkylated anionic sulfonated surfactant represented by Formula II, wherein (i) $R^1$ represents a linear or branched $C_{12}$ alkyl, and $R^2$ and $R^3$ represent hydrogen, or (ii) each of $R^1$ and $R^2$ or $R^1$ and $R^3$ represent a linear or branched $C_{12}$ alkyl, and $R^2$ or $R^3$ represents hydrogen, respectively (e.g., a "linear or branched mono- or di-dodecyl diphenyl disulfonate"), such as comprise at least 10 wt. %, 15 wt. %, 20 wt. %, 40 wt. %, 50 wt. %, 75 wt. %, 90 wt. %, or at least 95 wt. %, or is 100 wt. % of an anionic sulfonated surfactant comprising or consisting of a linear or branched mono- or di-dodecyl diphenyl disulfonate, or mixtures thereof, wherein M of said linear or branched mono- or di-dodecyl diphenyl disulfonate may represent an alkali metal, such as M represents Na.

In certain embodiments, the sulfonated surfactant composition may comprise at least 2 wt. % of an anionic sulfonated surfactant comprising or consisting of a linear or branched mono- or di-alkyl diphenyl ether disulfonate (such as represented by Formula III, wherein the sum (m+n) is 2, and wherein (i) $R^1$ represents a linear or branched $C_6$-$C_{24}$ alkyl, and $R^2$ and $R^3$ represent hydrogen, or (ii) each of $R^1$ and $R^2$ or $R^1$ and $R^3$ represent a linear or branched $C_6$-$C_{24}$ alkyl, and $R^2$ or $R^3$ represents hydrogen, respectively), or mixtures thereof. For example, in certain embodiments, the sulfonated surfactant composition may comprise at least 5 wt. % of an anionic sulfonated surfactant comprising or consisting of a linear or branched mono- or di-alkyl diphenyl ether disulfonate, or mixtures thereof, such as comprise at least 10 wt. %, 15 wt. %, 20 wt. %, 40 wt. %, 50 wt. %, 75 wt. %, 90 wt. %, or at least 95 wt. %, or is 100 wt. % of an anionic sulfonated surfactant comprising or consisting of a linear or branched mono- or di-alkyl diphenyl ether disulfonate, or mixtures thereof, wherein the linear or branched alkyl group of the mono- or di-alkyl diphenyl ether disulfonate (e.g. (i) $R^1$ group or (ii) each of $R^1$ and $R^2$ or $R^1$ and $R^3$ groups, respectively) may be a linear or branched $C_4$-$C_8$ alkyl, a $C_6$-$C_{10}$ alkyl, a $C_8$-$C_{14}$ alkyl, a $C_{12}$-$C_{16}$ alkyl, a $C_{14}$-$C_{18}$ alkyl, a $C_{16}$-$C_{20}$ alkyl, and/or a $C_{18}$-$C_{24}$ alkyl, or mixtures thereof, and wherein the salt of said mono- or di-alkyl diphenyl ether disulfonate (for example, wherein the sum (m+n) is 2, and wherein at least one of the moieties represented by $SO_3M$ is not $SO_3H$) may be an alkali metal salt (such as a sodium salt (e.g., wherein M is Na) or potassium salt (e.g., wherein M is K)), an ammonium salt (e.g., wherein M represents $N(R^4)_4$), or an aminoalcohol salt. In certain embodiments, the sulfonated surfactant composition may comprise at least 5 wt. % of an anionic sulfonated surfactant comprising or consisting of a linear or branched mono- or di-alkylated anionic sulfonated surfactant represented by Formula III, wherein (i) $R^1$ represents a linear or branched $C_6$ alkyl, and $R^2$ and $R^3$ represent hydrogen, or (ii) each of $R^1$ and $R^2$ or $R^1$ and $R^3$ represent a linear or branched $C_6$ alkyl, and $R^2$ or $R^3$ represents hydrogen, respectively (e.g., a "linear or branched mono- or di-hexyl diphenyl ether disulfonate"), such as comprise at least 10 wt. %, 15 wt. %, 20 wt. %, 40 wt. %, 50 wt. %, 75 wt. %, 90 wt. %, or at least 95 wt. %, or is 100 wt. % of an anionic sulfonated surfactant comprising or consisting of a linear or branched mono- or di-hexyl diphenyl ether disulfonate, or mixtures thereof, wherein M of said linear or branched mono- or di-hexyl diphenyl ether disulfonate may represent an alkali metal, such as M represents Na. In certain embodiments, the sulfonated surfactant composition may comprise at least 5 wt. % of an anionic sulfonated surfactant comprising or consisting of a linear or branched mono- or di-alkylated anionic sulfonated surfactant represented by Formula III, wherein (i) $R^1$ represents a linear or branched $C_{12}$ alkyl, and $R^2$ and $R^3$ represent hydrogen, or (ii) each of $R^1$ and $R^2$ or $R^1$ and $R^3$ represent a linear or branched $C_{12}$ alkyl, and $R^2$ or $R^3$ represents hydrogen, respectively (e.g., a "linear or branched mono- or di-dodecyl diphenyl ether disulfonate"), such as comprise at least 10 wt. %, 15 wt. %, 20 wt. %, 40 wt. %, 50 wt. %, 75 wt. %, 90 wt. %, or at least 95 wt. %, or is 100 wt. % of an anionic sulfonated surfactant comprising or consisting of a linear or branched mono- or di-dodecyl diphenyl ether disulfonate, or mixtures thereof, wherein M of said linear or branched mono- or di-dodecyl diphenyl ether disulfonate may represent an alkali metal, such as M represents Na.

In certain embodiments, the sulfonated surfactant composition may comprise at least 2 wt. % of an anionic sulfonated surfactant comprising or consisting of a linear or branched alkylbenzene sulfonate (such as represented by Formula IV, wherein (i) $R^1$ represents a linear or branched $C_6$-$C_{24}$ alkyl, and $R^2$ represents hydrogen, or (ii) each of $R^1$ and $R^2$ represent a linear or branched $C_6$-$C_{24}$ alkyl, respectively). For example, in certain embodiments, the sulfonated surfactant composition may comprise at least 5 wt. % of an anionic sulfonated surfactant comprising or consisting of a linear or branched alkylbenzene sulfonate, such as comprise at least 10 wt. %, 15 wt. %, 20 wt. %, 40 wt. %, 50 wt. %, 75 wt. %, 90 wt. %, or at least 95 wt. %, or is 100 wt. % of an anionic sulfonated surfactant comprising or consisting of a linear or branched alkylbenzene sulfonate, wherein the linear or branched alkyl group of the alkylbenzene sulfonate (e.g. (i) $R^1$ group or (ii) each of $R^1$ and $R^2$, respectively) may be a linear or branched $C_4$-$C_8$ alkyl, a $C_6$-$C_{10}$ alkyl, a $C_8$-$C_{14}$ alkyl, a $C_{12}$-$C_{16}$ alkyl, a $C_{14}$-$C_{18}$ alkyl, a $C_{16}$-$C_{20}$ alkyl, and/or a $C_{18}$-$C_{24}$ alkyl, or mixtures thereof, and wherein the salt of said linear or branched alkylbenzene sulfonate (for example, wherein the moiety represented by $SO_3M$ is not $SO_3H$) may be an alkali metal salt (such as a sodium salt (e.g., wherein M is Na) or potassium salt (e.g., wherein M is K)), an ammonium salt (e.g., wherein M represents $N(R^4)_4$), or an aminoalcohol salt. In certain embodiments, the sulfonated surfactant composition may comprise at least 5 wt. % of an anionic sulfonated surfactant comprising or consisting of a linear or branched mono- or di-alkylated anionic sulfonated surfactant represented by Formula IV, wherein (i) $R^1$ represents a linear or branched $C_6$ alkyl, and $R^2$ represents hydrogen, or (ii) each of $R^1$ and $R^2$ represent a linear or branched $C_6$ alkyl, respectively (e.g., a "linear or branched hexylbenzene sulfonate"), such as comprise at least 10 wt. %, 15 wt. %, 20 wt. %, 40 wt. %, 50 wt. %, 75 wt. %, 90 wt. %, or at least 95 wt. %, or is 100 wt. % of an anionic sulfonated surfactant comprising or consisting of a linear or branched hexylbenzene sulfonate, or mixtures thereof, wherein M of said linear or branched hexylbenzene sulfonate may represent an alkali metal, such as M represents Na. In certain embodiments, the sulfonated surfactant composition may comprise at least 5 wt. % of an anionic sulfonated surfactant comprising or consisting of a linear or branched mono- or di-alkylated anionic sulfonated surfactant represented by Formula IV, wherein (i) $R^1$ represents a linear or branched $C_{12}$ alkyl, and $R^2$ represents hydrogen, or (ii) each of $R^1$ and $R^2$ represent a linear or branched $C_{12}$ alkyl, respectively (e.g., a "linear or branched dodecylbenzene sulfonate"), such as comprise at least 10 wt. %, 15 wt. %, 20 wt. %, 40 wt. %, 50 wt. %, 75 wt. %, 90 wt. %, or at least 95 wt. %, or is 100 wt. % of an anionic sulfonated surfactant comprising or consisting of a linear or branched dodecylbenzene sulfonate, or mixtures thereof, wherein M of said linear or branched dodecylbenzene sulfonate may represent an alkali metal, such as M represents Na.

In certain embodiments, the sulfonated surfactant composition may comprise at least 2 wt. % of an anionic sulfonated surfactant comprising or consisting of a linear or branched alkylbenzene sulfonate represented by Formula IV (sometimes referred to as alkylamine alkylbenzene sulfonate or an alkylammonium alkylbenzene sulfonate; wherein M represents an ammonium represented by $N(R^4)_4$, and $R^4$ independently represents a hydrogen, or a linear or branched $C_3$-$C_6$ alkyl, and wherein (i) $R^1$ represents a linear or branched $C_6$-$C_{24}$ alkyl, and $R^2$ represents hydrogen, or (ii) each of $R^1$ and $R^2$ represent a linear or branched $C_6$-$C_{24}$ alkyl, respectively), such as a linear or branched $C_3$-$C_6$ alkylamine alkylbenzene sulfonate (e.g., wherein M represents $NH_3R^4$ or $N(R^4)_4$, wherein $R^4$ independently represents a linear or branched $C_3$-$C_6$ alkyl), for example, wherein $R^4$ independently represents a linear or branched $C_3$ alkyl, such as an isopropylamine linear alkylbenzene sulfonate or an isopropylamine branched alkylbenzene sulfonate, or mixtures thereof. For example, in certain embodiments, the sulfonated surfactant composition may comprise at least 5 wt. % of an anionic sulfonated surfactant comprising or consisting of an alkylamine alkylbenzene sulfonate, such as comprise at least 10 wt. %, 15 wt. %, 20 wt. %, 40 wt. %, 50 wt. %, 75 wt. %, 90 wt. %, or at least 95 wt. %, or is 100 wt. % of an anionic sulfonated surfactant comprising or consisting of an alkylamine alkylbenzene sulfonate, wherein the alkyl group of the alkylamine portion of the alkylamine alkylbenzene sulfonate (e.g. $R^4$ group) may independently be a linear or branched $C_3$ alkyl, a linear or branched $C_4$ alkyl, a linear or branched $C_5$ alkyl, or a linear or branched $C_6$ alkyl, wherein the alkyl group of the alkylbenzene sulfonate portion of the alkylamine alkylbenzene sulfonate (e.g. (i) $R^1$ group or (ii) each of $R^1$ and $R^2$, respectively) may be a linear or branched $C_4$-$C_8$ alkyl, a $C_6$-$C_{10}$ alkyl, a $C_8$-$C_{14}$ alkyl, a $C_{12}$-$C_{16}$ alkyl, a $C_{14}$-$C_{18}$ alkyl, a $C_{16}$-$C_{20}$ alkyl, and/or a $C_{18}$-$C_{24}$ alkyl, or mixtures thereof. In certain embodiments, the sulfonated surfactant composition may comprise at least 5 wt. % of an anionic sulfonated surfactant comprising or consisting of a linear or branched mono- or di-alkylated anionic sulfonated surfactant represented by Formula IV, wherein at least one $R^4$ independently represents a linear or branched $C_3$ alkyl (e.g., wherein M represents $NH_3R^4$ or $N(R^4)_4$, wherein $R^4$ represents a linear or branched $C_3$-$C_6$ alkyl), and wherein (i) $R^1$ represents a linear or branched $C_6$ alkyl, and $R^2$ represents hydrogen, or (ii) each of $R^1$ and $R^2$ represent a linear or branched $C_6$ alkyl, respectively (e.g., a "an isoproylamine linear or branched hexylbenzene sulfonate"), such as comprise at least 10 wt. %, 15 wt. %, 20 wt. %, 40 wt. %, 50 wt. %, 75 wt. %, 90 wt. %, or at least 95 wt. %, or is 100 wt. % of an anionic sulfonated surfactant comprising or consisting of an isoproylamine linear or branched hexylbenzene sulfonate, or mixtures thereof. In certain embodiments, the sulfonated surfactant composition may comprise at least 5 wt. % of an anionic sulfonated surfactant comprising or consisting of a linear or branched mono- or di-alkylated anionic sulfonated surfactant represented by Formula IV, wherein at least one $R^4$ independently represents a linear or branched $C_3$ alkyl (e.g., wherein M represents $NH_3R^4$ or $N(R^4)_4$, wherein $R^4$ independently represents a linear or branched $C_3$-$C_6$ alkyl), and wherein (i) $R^1$ represents a linear or branched $C_{12}$ alkyl, and $R^2$ represents hydrogen, or (ii) each of $R^1$ and $R^2$ represent a linear or branched $C_{12}$ alkyl, respectively (e.g., a "an isoproylamine linear or branched dodecylbenzene sulfonate"), such as comprise at least 10 wt. %, 15 wt. %, 20 wt. %, 40 wt. %, 50 wt. %, 75 wt. %, 90 wt. %, or at least 95 wt. %, or is 100 wt. % of an isoproylamine linear or branched dodecylbenzene sulfonate, or mixtures thereof.

In certain embodiments, the sulfonated surfactant composition may comprise at least 5 wt. % of an anionic sulfonated surfactant comprising or consisting of a DOWFAX-type, CALFAX-type, CALSOFT type, or Calimulse type sulfonated surfactant, such as comprise at least 10 wt. %, 15 wt. %, 20 wt. %, 40 wt. %, 50 wt. %, 75 wt. %, 90 wt. %, or at least 95 wt. %, or is 100 wt. % of an anionic sulfonated surfactant comprising or consisting of DOWFAX-type, CALFAX-type, CALSOFT type, or Calimulse type sulfonated surfactant.

The term "DOWFAX" is understood to mean a tradename used to describe a class of sulfonated surfactants. DOWFAX surfactants have a disulfonated structure. While most other surfactants have only one ionic charge per molecule DOWFAX surfactants have two. The chemical structure comprises a pair of sulfonate groups on a diphenyl oxide backbone (such as represented by Formula III); the hydrophobe (such as groups $R^1$, $R^2$, and/or $R^3$ of Formula III) may be a linear or branched alkyl group comprised of from six to sixteen carbons. Disulfonated structure is the key, while most other surfactants have only one ionic charge per molecule, DOWFAX surfactants have two (such as the sum (m+n) of Formula III is 2). DOWFAX C6L surfactant has a linear 6-carbon hydrophobe (such as at least one of groups $R^1$, $R^2$, and/or $R^3$ of Formula III is a linear $C_6$). DOWFAX 3B2 surfactant has a linear 10-carbon hydrophobe (such as at least one of groups $R^1$, $R^2$, and/or $R^3$ of Formula III is a linear $C_{10}$). DOWFAX C10L surfactant has a linear 10-carbon hydrophobe (such as at least one of groups $R^1$, $R^2$, and/or $R^3$ of Formula III is a linear $C_{10}$). DOWFAX 2A1 surfactant has a branched 12-carbon hydrophobe (such as at least one of groups $R^1$, $R^2$, and/or $R^3$ of Formula III is a branched $C_{12}$). DOWFAX 8390 surfactant has a linear 16-carbon hydrophobe (such as at least one of groups $R^1$, $R^2$, and/or $R^3$ of Formula III is a linear $C_{16}$). DOWFAX 3B0 surfactant is the acid form of DOWFAX 3B2 surfactant (such as at least one of groups $R^1$, $R^2$, and/or $R^3$ of Formula III is a linear $C_{10}$, and $SO_3M$ is $SO_3H$). DOWFAX 2A0 surfactant is the acid form of DOWFAX 2A1 surfactant (such as at least one of groups $R^1$, $R^2$, and/or $R^3$ of Formula III is a branched $C_{12}$, and $SO_3M$ is $SO_3H$).

The term "oil field" or "oilfield" is understood to mean a region with an abundance of oil wells extracting petroleum (crude oil) from below ground. Because the oil reservoirs typically extend over a large area, possibly several hundred kilometres across, full exploitation entails multiple wells scattered across the area. In addition, there may be exploratory wells probing the edges, pipelines to transport the oil elsewhere, and support facilities.

The term "Oilfield chemicals" is understood to mean any chemicals used in an oilfield.

The term "Viscoelasticity" is understood to mean the property of materials that exhibit both viscous and elastic characteristics when undergoing deformation. Viscous materials, like honey, resist shear flow and strain linearly with time when a stress is applied. Elastic materials strain when stretched and quickly return to their original state once the stress is removed. Viscoelastic materials have elements of both of these properties and, as such, exhibit time-dependent strain.

The term "VES" is understood to mean viscoelastic surfactant.

The term "VES system" is understood to mean an oilfield fluid that is comprised of surfactants and exhibits shear thinning properties.

The term "Shear thinning" is understood to mean a fluid whose viscosity decreases when it is put under increasing shear strain.

The term "Shear thinning value" is understood to mean a value to evaluate the property of shear thinning for a fluid. While the value is closer to 100%, the shear thinning performance is better. See the Shear-Thinning Value at certain Temperature for the calculation of shear thinning value.

The term "Tolerance to temperature value" is understood to mean a value to evaluate the remaining shear thinning of a fluid at certain temperature. The fluid may lose its shear thinning property partially or completely at certain temperature regardless of the viscosity of fluid. While the value is closer to 0, the remaining shear thinning property is less, and thus the tolerance to temperature is worse. See the Tolerance to temperature value for the calculation of Tolerance to temperature value.

The term "Temperature stability value" is understood to mean a value to evaluate the viscosity change of fluid at 200° F. compared to that at 75° F. under pressure of 500 psi. See the Temperature stability value for the calculation of temperature stability value.

In one aspect the invention provides a composition comprising at least one sulfonated surfactant composition and one or more star macromolecules having a core and a plurality of polymeric arms, wherein:
a) at least one polymeric arm of the plurality of polymeric arms is a hydrophilic polymeric arm;
b) at least one polymeric arm of the plurality of polymeric arms is a copolymeric arm, wherein at least one copolymeric arm:
  1) comprises a longer hydrophilic segment proximal to the core and a shorter hydrophobic segment distal to the core; and
  2) has a greater degree of polymerization than the at least one hydrophilic polymeric arm.

In another aspect of the invention, "a sulfonated surfactant" means at least one surfactant from the following family: DOWFAX-type sulfonated surfactants, CALFAX-type sulfonated surfactants, CALSOFT-type sulfonated surfactants and Calimulse-type sulfonated surfactants.

In one aspect, the composition of DOWFAX-type specialized surfactant may include, but is not limited to, Benzene, 1,1'-oxybis-, tetrapropylene derivatives, sulfonated, sodium salts; Benzenesulfonic acid, branched dodecyl (sulfophenoxy), disodium salt; Disodiumn oxybis(dodecylbenzenesulfonate); Disodium dodecyl(sulfophenoxy)-benzenesulfonate; Sodium dodecyl(phenoxy)-benzenesulfonate; Sodium oxybis(dodecylbenzene)sulfonate; Benzenesulfonic acid, branched dodecyl-, (branched dodecyl phenoxy), sodium salt; Benzenesulfonic acid, phenoxy, branched dodecyl-, sodium salt; Benzenesulfonic acid, oxybis(branched dodecyl-), disodium salt; Disodium oxybis(dodecylbenzenesulfonate); Disodium dodecyl(sulfophenoxy)-benzenesulfonate; Sodium dodecyl (phenoxy)-benzenesulfonate; Disodium dodecyl(sulfophenoxy)-benzenesulfonate, C10 (Linear) Sodium Diphenyl Oxide Disulfonate, C16 (Linear) Sodium Diphenyl Oxide Disulfonate, C6 (Linear) Diphenyl Oxide Disulfonic Acid, C12 (Branched) Sodium Diphenyl Oxide Disulfonate, C12 (Branched) Diphenyl Oxide Disulfonic Acid, C12 (Branched) Diphenyl Oxide Disulfonic Acid, Sodium alkyl diphenyl oxide sulfonate.

In one aspect, the composition of CALFAX-type specialized surfactant may include, but is not limited to, Benzene, 1,1'-oxybis-, tetrapropylene derivatives, sulfonated, sodium salts; Benzenesulfonic acid, branched dodecyl(sulfophenoxy), disodium salt; Disodium oxybis(dodecylbenzenesulfonate); Disodium dodecyl(sulfophenoxy)-benzenesulfonate; Sodium dodecyl(phenoxy)-benzenesulfonate; Sodium oxybis(dodecylbenzene)sulfonate; Benzenesulfonic acid, branched dodecyl-, (branched dodecyl phenoxy), sodium salt; Benzenesulfonic acid, phenoxy, branched dodecyl-, sodium salt; Benzenesulfonic acid, oxybis (branched dodecyl-), disodium salt; Disodium oxybis(dodecylbenzenesulfonate); Disodium dodecyl(sulfophenoxy)-benzenesulfonate; Sodium dodecyl(phenoxy)-benzenesulfonate; Disodium dodecyl(sulfophenoxy)-benzenesulfonate, C10 (Linear) Sodium Diphenyl Oxide Disulfonate, C16 (Linear) Sodium Diphenyl Oxide Disulfonate, C6 (Linear) Diphenyl Oxide Disulfonic Acid, C12 (Branched) Sodium Diphenyl Oxide Disulfonate, C12 (Branched) Diphenyl Oxide Disulfonic Acid, C12 (Branched) Diphenyl Oxide Disulfonic Acid, Sodium alkyl diphenyl oxide sulfonate.

In one aspect, the composition of CALSOFT-type specialized surfactant may include, but is not limited to, Sodium Alpha Olefin (C12) Sulfonate, Sodium Alpha Olefin (C14-16) Sulfonate, Sodium Olefin Sulfonate, Sodium Linear Alkyl Benzene Sulfonate, Sodium Linear Alkyl Benzene Sulfonate, Linear Alkyl Benzene Sulfonic Acid, Linear Alkyl Benzene Sulfonic Acid, Sodium Oleic Sulfonate, Triethanolamine Linear Alkyl Benzene Sulfonate.

In one aspect, the composition of Calimulse-type specialized surfactant may include, but is not limited to, Isopropylamine Branched Alkyl Benzene Sulfonate, Sodium Alpha Olefin Sulfonate, Sodium C14-16 alpha olefin sulfonate, Sodium Branched Dodecyl Benzene Sulfonate, Sodium Branched Alkyl Benzene Sulfonate, Branched Dodecyl Benzene Sulfonic Acid, Sodium Linear Alkyl Benzene Sulfonate, Isopropylamine Branched Alkyl Benzene Sulfonate, Isopropylamine Linear Alkyl Benzene Sulfonate.

In one aspect, DOWFAX surfactants and CALFAX surfactants have a disulfonated structure. While most other surfactants have only one ionic charge per molecule DOWFAX surfactants and CALFAX surfactants have two. The chemical structure of a DOWFAX surfactant and a CALFAX surfactant (such as represented by Formula III) comprise a pair of sulfonate groups on a diphenyl oxide backbone; the hydrophobe may be a linear or branched alkyl group comprised of from six to sixteen carbons. Disulfonated structure is the key, while most other surfactants have only one ionic charge per molecule, DOWFAX surfactants and CALFAX surfactants have two.

The DOWFAX family may include, but is not limited to, DOWFAX 2A1, DOWFAX 3B2, DOWFAX C10L, DOWFAX 8390, DOWFAX C6L, DOWFAX 30599, DOWFAX 2A0.

The Calfax family may include, but is not limited to, Calfax 10L-45, Calfax 16L-35, Calfax 6LA-70, Calfax DB-45, Calfax DBA-40, Calfax DBA-70.

Other tradenames of specialized surfactants may include, but are not limited to, CALSOFT, WITCONATE, NAXEL, RHODACAL, CALFAX, DOWFAX, HOSTAPUR, NAXAN, NAXONATE, CALBLEND, CALIMULSE In one aspect the invention provides a polymer composition comprising star macromolecules, each star macromolecule having a core and two or more arms, wherein the number of arms within a star macromolecule varies across the composition of star molecules; and the arms on a star are covalently attached to the core of the star; each arm comprises one or more (co)polymer segments; and at least one arm and/or at least one segment exhibits a different solubility from at least one other arm or one other segment, respectively, in a reference liquid of interest.

In another aspect of the invention, the composition may be suitable in oilfield fluids and gels, including but not limited to, hydraulic fracturing fluids, completion fluids, stimulation fluids, drilling fluids, coiled tubing cleanout fluids, VES fluids, water flooding fluids and surfactant flood fluids.

In another aspect of the invention, the composition may be suitable in cosmetic and personal care applications, including but not limited to, cosmetic creams, lotions, gels, sprayable lotion, sprayable cream, sprayable gel, hair styling agents, hair styling sprays and mousses, mouse, hair conditioners, shampoos, bath and shower preparations, shower gel, hair gel, hair care product, ointments, deodorants and antiperspirants, anti-persperant ingredient, deodorant ingredient, mascara, blush, lip stick, eye liner, perfumes, powders, serums, skin sensoric, skin cleansers, skin conditioners, emollient, skin emollients, skin moisturizers, moisturizer, skin wipes, sensory modifier, skin care product, make-up remover, eye cream, leave-on product, wash off product, products for care of the teeth and the mouth, whitening products, mouthwash, products for external intimate hygiene, sunscreens, products for tanning without sun, shaving preparations, shaving cream, depilatories, products removing make-up, products for external intimate hygiene, spermicides, condom lubricant, personal hygiene lubricant, solids, fabric softeners, cleansing product, cleansing spray, emulsifier, wetting agent, foamer, soap, soaps, liquid soap, hand sanitizer, hand gel, conditioner, humectant, foam stabilizer, softener, clarifier, film former, delivery system, oil deliver system, active deliver system, rheology modifier, thickening agent, viscosifier, and lubricant.

In another aspect of the invention, the composition may be suitable in home care applications, including but not limited to, cleaners for windows and glass, and other household surfaces; cleaners for toilet areas; hard surface cleaners; household cleaners; industrial cleaners; window cleaners; floor cleaners; shower cleaners; drain cleaners; oven cleaners; tub, tile and sink cleaners; bleach; bleach containing cleaners; degreasers; enzyme production; liquid and gelled soaps; polishes and waxes; car wax; floor wax; polishes; polish; detergents; liquid and powdered detergents, including detergents for laundry and in dish washing; laundry detergents; laundry softeners; hard water mineral removers; metal cleaner and polishes; carpet and rug cleaners; dusting products; upholstery cleaners; and floor care products.

In one aspect of the invention, there is a process of forming a mikto star macromolecule comprising:
i) creating a reaction mixture comprising a plurality of first polymeric segments having an ATRP-functional terminal group and a plurality of second monomers, wherein at least a portion of the first polymeric segments are formed by polymerizing a plurality of first monomers, non-limiting examples of first monomers include hydrophobic monomers;
ii) forming a second polymeric segment extending from said first polymeric segment by activating the ATRP-functional terminal group on said first polymeric segment to initiate polymerization of a portion of the second monomers, to form a plurality of block copolymeric arms;
iii) during the polymerization of the second monomers, introducing a plurality of second monomer initiators having an ATRP functional terminal group into the reaction mixture;
iv) activating the ATRP-functional terminal group on said second monomer initiator to initiate polymerization of a second portion of the second monomer, to form a plurality of new polymeric arms; and
v) crosslinking at least a portion of the block copolymeric arms and at least a portion of the new polymeric arms to form at least one mikto star macromolecule.

In one aspect of the invention, there is a star macromolecule that forms a gel when dissolved in water at a concentration of at least 0.2 wt. % and is formed by:
i) creating a reaction mixture comprising a plurality of first polymeric segments having an ATRP-functional terminal group and a plurality of second monomers, wherein at least a portion of the first polymeric segments are formed by polymerizing a plurality of first monomers;
ii) forming a second polymeric segment extending from said first polymeric segment by activating the ATRP-functional terminal group on said first polymeric segment to initiate polymerization of a portion of the second monomers, to form a plurality of block copolymeric arms;
iii) during the polymerization of the second monomers, introducing a plurality of second monomer initiators having an ATRP functional terminal group into the reaction mixture;
iv) activating the ATRP-functional terminal group on said second monomer initiator to initiate polymerization of a second portion of the second monomer, to form a plurality of new polymeric arms; and
v) crosslinking at least a portion of the block copolymeric arms and at least a portion of the new polymeric arms;

wherein:
a) the gel has a dynamic viscosity of at least 20,000 cP; and
b) the star macromolecule has a molecular weight of 50,000 g/mol and 1,000,000 g/mol.

In one aspect of the invention, there is a star macromolecule polymer composition comprising one or more star macromolecules prepared by an improved, efficient arm-first living-controlled radical polymerization method, wherein the one or more star macromolecules are represented by Formula A:

$$[(P1)_{q1}-(P2)_{q2}]_t-\text{Core}-[(P3)_{q3}]_r \qquad \text{Formula A}$$

wherein:
Core represents a crosslinked polymeric segment;
P1 represents a hydrophobic polymeric segment comprised of repeat units of monomeric residues of polymerized monomers;
P2 represents a hydrophilic polymeric segment comprised of repeat units of monomeric residues of polymerized monomers;
P3 represents a hydrophilic polymeric segment comprised of repeat units of monomeric residues of polymerized monomers;
q1 represents the number of repeat units in P1 and has a value between 1 and 50;
q2 represents the number of repeat units in P2 and has a value between 30 and 2000;
q3 represents the number of repeat units in P3 and has a value between 5 and 2000;
r represents the number of block copolymeric arms covalently attached to the Core;
t represents the number of polymeric arms covalently attached to the Core; and
wherein the molar ratio of r to t is in the range of between 40:1 and 2:1.

In certain embodiments, the surfactant-system thickening macromolecule may be represented by Formula B:

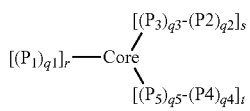

Formula B wherein:
Core represents a crosslinked polymeric segment;
P1 independently represents a polymeric segment of a first polymeric arm comprised of monomeric residues of polymerized hydrophilic monomers;
P2 independently represents a further segment of a second polymeric arm comprised of at least one monomeric residue of a polymerized hydrophobic monomer;
P3 independently represents a polymeric segment of the second polymeric arm comprised of monomeric residues of polymerized hydrophilic monomers;
P4 independently represents a polymeric segment of a third polymeric arm comprised of monomeric residues of polymerized hydrophobic monomers;
P5 independently represents a polymeric segment of the third polymeric arm comprised of monomeric residues of polymerized hydrophilic monomers;
q1 independently represents the number of monomeric residues in P1 and has a value between 5 and 2000;
q2 independently represents the number of monomeric residues in P2 and has a value between 1 and 500;
q3 independently represents the number of monomeric residues in P3 and has a value between 10 and 5000;
q4 independently represents the number of monomeric residues in P4 and has a value between 1 and 500;
q5 independently represents the number of monomeric residues in P5 and has a value between 10 and 5000;
r independently represents the number of the first polymeric arms covalently attached to the Core and has a value in the range of from 1 to 1000;
s independently represents the number of the second polymeric arms covalently attached to the Core and has a value in the range of from 1 to 1000; and
t independently represents the number of the third polymeric arms covalently attached to the Core and has a value in the range of from 0 to 1000; and
wherein the ratio of r:s, and, if t is not zero, the ratio of r:t, t:s, and r:(s+t), are independently in the range of between 40:1 and 1:40.

In certain embodiments, the polymeric arms of the star macromolecule may comprise a hydrophilic polymeric segment, such as a water soluble polymeric segment, a hydrophobic polymeric segment, or a surfactant-system thickening polymeric segment. The hydrophilic polymeric segment, for example, may be a water soluble polymeric segment, and may comprise a poly(acrylic acid), poly(2-hydroxyethyl acrylate), poly(N-isopropylacrylamide), poly(ethylene glycol) methacrylate, or quaternized poly(dimethylaminoethyl methacrylate), polymeric segments. The hydrophobic polymeric segment, for example, may comprise polystyrene or substituted polystyrenes, poly(alkyl(meth)acrylate) or a hydrocarbon-based polymeric segments. Suitable hydrocarbon-based segments may comprise low molecular weight α-olefin. Lower molecular weight α-olefins are commercially available and higher molecular weight species may be prepared by telomerization of ethylene or ethylene propylene mixtures.

Suitable hydrophilic monomers that may be used to form a polymeric arm or a segment of a polymeric arm, for example, a polymeric segment of a polymeric arm, such as for P1, P3, or P5 (or optionally within P2), of a star macromolecule may include, but is not limited to, 2-acrylamido-2-methylpropane sulfonic acid (AMPS), styrene sulphonic acid, protected and unprotected acrylic acids and methacrylic acids including: acrylic acid, methacrylic acid, ethacrylic acid, methyl acrylate, ethyl acrylate, α-butyl acrylate, iso-butyl acrylate, t-butyl acrylate, 2-ethylhexyl acrylate, decyl acrylate, octyl acrylate; methyl methacrylate; ethyl methacrylate; n-butyl methacrylate; iso-butyl methacrylate; t-butyl methacrylate; 2-ethylhexyl methacrylate; decyl methacrylate; methyl ethacrylate; ethyl ethacrylate; n-butyl ethacrylate; iso-butyl ethacrylate; t-butyl ethacrylate; 2-ethylhexyl ethacrylate; decyl ethacrylate; 2,3-dihydroxypropyl acrylate; 2,3-dihydroxypropyl methacrylate; 2-hydroxyethyl acrylate; 2-hydroxypropyl acrylate; hydroxypropyl methacrylate; glyceryl monoacrylate; glyceryl monoethacrylate; glycidyl methacrylate; glycidyl acrylate; acrylamide; methacrylamide; ethacrylamide; N-methyl acrylamide; N,N-dimethyl acrylamide; N,N-dimethyl methacrylamide; N-ethyl acrylamide; N-isopropyl acrylamide; N-butyl acrylamide; N-t-butyl acrylamide; N,N-di-n-butyl acrylamide; N,N-diethylacrylamide; N-octyl acrylamide; N-octadecyl acrylamide; N,N-diethylacrylamide; N-phenyl acrylamide; N-methyl methacrylamide; N-ethyl methacrylamide; N-dodecyl methacrylamide; N,N-dimethylaminoethyl acrylamide; quaternised N,N-dimethylaminoethyl acrylamide; N,N-dimethylaminoethyl methacrylamide; quaternised N,N-dimethylaminoethyl methacrylamide; N,N-dimethylaminoethyl acrylate; N,N-dimethylaminoethyl methacrylate; quaternised N,N-dimethyl-aminoethyl acrylate; quaternised N,N-dimethylaminoethyl methacrylate; 2-hydroxyethyl acrylate; 2-hydroxyethyl methacrylate; 2-hydroxyethyl ethacrylate; glyceryl acrylate; 2-methoxyethyl acrylate; 2-methoxyethyl methacrylate; 2-methoxyethyl ethacrylate; 2-ethoxyethyl acrylate; 2-ethoxyethyl methacrylate; 2-ethoxyethyl ethacrylate; maleic acid; maleic anhydride and its half esters; fumaric acid; itaconic acid; itaconic anhydride and its half esters; crotonic acid; angelic acid; diallyldimethyl ammonium chloride; vinyl pyrrolidone vinyl imidazole; methyl vinyl ether; methyl vinyl ketone; maleimide; vinyl pyridine; vinyl pyridine-N-oxide; vinyl furan; styrene sulphonic acid and its salts; allyl alcohol; allyl citrate; allyl tartrate; vinyl acetate; vinyl alcohol; vinyl caprolactam; vinyl acetamide; or vinyl formamide. For example, the hydrophilic monomer may comprise protected and unprotected acrylic acid, such as methacrylic acid, ethacrylic acid, methyl acrylate, ethyl acrylate, α-butyl acrylate, iso-butyl acrylate, t-butyl acrylate, 2-ethylhexyl acrylate, decyl acrylate, octyl acrylate; methyl acrylate; methyl methacrylate; methyl ethacrylate; ethyl acrylate; ethyl methacrylate; ethyl ethacrylate; n-butyl acrylate; n-butyl methacrylate; n-butyl ethacrylate; 2-ethylhexyl acrylate; 2-ethylhexyl methacrylate; 2-ethylhexyl ethacrylate; N-octyl acrylamide; 2-methoxyethyl acrylate; 2-hydroxyethyl acrylate; N,N-dimethylaminoethyl acrylate; N,N-dimethylaminoethyl methacrylate; acrylic acid; methacrylic acid; N-t-butylacrylamide; N-sec-butylacrylamide; N,N-dimethylacrylamide; N,N-dibutylacrylamide; N,N-dihydroxyethylacrylamide; 2-hydroxyethyl acrylate; 2-hydroxyethyl methacrylate; benzyl acrylate; 4-butoxycarbonylphenyl acrylate; butyl acrylate; 4-cyanobutyl acrylate; cyclohexyl acrylate; dodecyl acrylate; 2-ethylhexyl acrylate; heptyl acrylate; iso-butyl acrylate; 3-methoxybutyl acrylate; 3-methoxypropyl acrylate; methyl acrylate; N-butyl acrylamide; N,N-dibutyl acrylamide; ethyl acrylate; methoxyethyl acrylate; hydroxyethyl acrylate; or diethyleneglycolethyl acrylate. For example, the hydrophilic monomer may comprise protected and unprotected acrylic acid, such as methacrylic acid, ethacrylic acid, methyl acrylate, ethyl acrylate, α-butyl acrylate, iso-butyl acrylate, t-butyl acrylate, 2-ethylhexyl acrylate, decyl acrylate, octyl acrylate; 2-hydroxyethyl acrylate; N-isopropylacrylamide; ethylene glycol methacrylate; (polyethylene glycol) methacrylate; or quaternized dimethylaminoethyl methacrylate. For example, the hydrophilic monomer may comprise acrylic acid, methacrylic acid, 2-hydroxyethyl acrylate, acrylamide, vinyl pyrrolidone, vinyl pyridine, styrene sulphonic acid, PEG-methacrylate, 2-(dimethylamino)ethyl methacrylate, 2-(trimethylamino)ethyl methacrylate, 2-acrylamido-2-methylpropane sulphonic acid, acrylic acid, acrylic anhydride, beta-carboxyethyl acrylate, methacrylic acid, 4-methacryloxyethyl trimellitic anhydride, 3-methacryloyl-(1)-lysine, o-nitrobenzyl methacrylate, 2-propene-1-sulfonic acid, 2-sulfoethyl methacrylate, trichloroacrylic acid, 4-vinylbenzoic acid, acrylamides, 2-(N,N-dimethylamino)-ethyl acrylate, N-[2-N,N-dimethylamino)-ethyl]methacrylamide, 2-(N,N-dimethylamino)-ethyl methacrylate, 3-dimethylaminoneopentylacrylate, N-[3-(N,N-methylamino)-propyl] acrylamide, N-[3-(N,N-Dimethylamino)-propyl] methacrylamide, 2-N-morpholinoethyl acrylate, 2-N-morpholinoethyl methacrylate, 3-methacryloyl-(l)-lysine, N,N-diallylamine, diallyldimethyl, 2-aminoethyl methacrylamide, N-(2-aminoethyl) methacrylamide hydrochloride, N-(3-aminopropyl)-methacrylamide hydrochloride, N-(t-BOC-aminopropyl)-acrylamide, 2-(t-butylamino)ethyl methacrylate, 2-(N,N-diethylamino)-ethyl methacrylate (DEAEMA), 2-diisopropylaminoethyl methacrylate, itaconic acid, maleic acid. For example, the hydrophilic monomer may comprise acrylic acid.

Suitable hydrophobic monomers that may be used to form a polymeric arm or a segment of a polymeric arm, for example, a polymeric segment of a polymeric arm, such as for P4 (or optionally within P2), of a star macromolecule may include, but is not limited to styrene, methyl acrylate, ethyl acrylate, n-butyl acrylate, iso-butyl acrylate, t-butyl acrylate, 2-ethylhexyl acrylate, octyl acrylate, decyl acrylate, methyl methacrylate; ethyl methacrylate; n-butyl methacrylate; iso-butyl methacrylate; t-butyl methacrylate; 2-ethylhexyl methacrylate; octyl methacrylate, decyl methacrylate, methyl ethacrylate; ethyl ethacrylate; n-butyl ethacrylate; iso-butyl ethacrylate; t-butyl ethacrylate; 2-ethylhexyl ethacrylate; octyl ethacrylate, decyl ethacrylate, 2,3-dihydroxypropyl acrylate; 2,3-dihydroxypropyl methacrylate; 2-hydroxypropyl acrylate; hydroxypropyl methacrylate; glycidyl methacrylate; glycidyl acrylate, acrylamides, styrene; styrene optionally substituted with one or more $C_1$-$C_{12}$ straight or branched chain alkyl groups; or alkylacrylate. For example, the hydrophobic monomer may comprise styrene; alpha-methylstyrene; t-butylstyrene; p-methylstyrene; methyl methacrylate; or t-butyl-acrylate. For example, the hydrophobic monomer may comprise styrene. In certain embodiments, the hydrophobic monomer may comprise a protected functional group.

In certain embodiments, suitable star macromolecules, or a method of making or using the same, may form an aqueous gel (e.g., a clear, homogeneous aqueous gel) at a concentration of 1.0 wt. % and has a dynamic viscosity of at least 50 cP in a 2.0 wt. % KCl and 0.3 wt. % DOWFAX 2A1 aqueous solution at a shear rate of 100 s$^{-1}$ at 75° F., according to the DOWFAX 2A1 Surfactant with KCl Compatibility Test, for example, has a dynamic viscosity of at least 100 cP, such as at least 150 cP; at least 250 cP; at least 300 cP; at least 400 cP; at least 500 cP; at least 700 cP; at least 1,000 cP; at least 1,500 cP; at least 2,000 cP; at least 3,000 cP; at least 4,000 cP; at least 5,000 cP; or at least 6,000 cP, according to the DOWFAX 2A1 Surfactant with KCl Compatibility Test. In certain embodiments, aqueous gels formed from suitable star macromolecules and DOWFAX 2A1 Surfactant may further have a shear thinning value of at least 15%, for example, at least 20%; at least 25%; at least 30%; at least 40%; at least 50%; at least 60%; at least 70%; at least 75%; at least 80%; at least 85%; or at least 90%, according to the DOWFAX 2A1 Surfactant with KCl Compatibility Test. In certain embodiments, aqueous gels formed from suitable star macromolecules and DOWFAX 2A1 Surfactant may further have a tolerance to temperature value of at least 60% in the temperature range of from 35 to 400° F., for example, at least 60% at 75° F.; at least 70% at 75° F.; at least 80% at 100° F.; at least 80% at 150° F.; at least 90% at 150° F.; at least 100% at 150° F.; at least 110% at 150° F.; at least 80% at 200° F.; at least 80% at 250° F.; at least 80% at 300° F.; at least 80% at 350° F.; or at least 80% at 400° F., according to the DOWFAX 2A1 Surfactant with KCl Compatibility Test. In certain embodiments, aqueous gels formed from suitable star macromolecules at a concentration of 1.0 wt. % and has a dynamic viscosity of at least 50 cP in a 2.0 wt. % KCl and 0.3 wt. % DOWFAX 2A1 aqueous solution at a shear rate of 100 s$^{-1}$ at 75° F., according to the DOWFAX 2A1 Surfactant with KCl Compatibility Test, and has a Dynamic Viscosity at 200° F. that is at least 50% relative to the viscosity of the gel at 75° F., according to the Temperature Stability Test, for example, a dynamic viscosity at 200° F. that is at least 60% relative to the viscosity of the gel at 75° F., such as at least 70%; at least 75%; at least 80%; at least 85%; or at least 90%, relative to the viscosity of the gel at 75° F., according to the Temperature Stability Test; or is greater than the viscosity of the gel at 75° F., according to the Temperature Stability Test.

In certain embodiments, suitable star macromolecules, or a method of making or using the same, may form an aqueous gel (e.g., a clear, homogeneous aqueous gel) at a concentration of 4.0 wt. % and has a dynamic viscosity of at least 50 cP in 2.0 wt. % DOWFAX 2A1 and seawater aqueous solution at a shear rate of 100 s$^{-1}$ at 75° F., according to the DOWFAX 2A1 Surfactant with seawater Compatibility Test, for example, has a dynamic viscosity of at least 100 cP, such as at least 150 cP; at least 250 cP; at least 300 cP; at least 400 cP; at least 500 cP; at least 700 cP; at least 1,000 cP; at least 1,500 cP; at least 2,000 cP; at least 3,000 cP; at least 4,000 cP; at least 5,000 cP; or at least 6,000 cP, according to the DOWFAX 2A1 Surfactant with seawater Compatibility Test. In certain embodiments, aqueous gels formed from suitable star macromolecules and DOWFAX 2A1 Surfactant may further have a shear thinning value of at least 15%, for example, at least 20%; at least 25%; at least 30%; at least 40%; at least 50%; at least 60%; at least 70%; at least 75%; at least 80%; at least 85%; or at least 90%, according to the DOWFAX 2A1 Surfactant with seawater Compatibility Test. In certain embodiments, aqueous gels formed from suitable star macromolecules and DOWFAX 2A1 Surfactant may further have a tolerance to temperature value of at least 60% in the temperature range from 35 to 400° F., for example, at least 60% at 75° F.; at least 70% at 75° F.; at least 80% at 100° F.; at least 80% at 150° F.; at least 90% at 150° F.; at least 100% at 150° F.; at least 110% at 150° F.; at least 80% at 200° F.; at least 80% at 250° F.; at least 80% at 300° F.; at least 80% at 350° F.; or at least 80% at 400° F., according to the DOWFAX 2A1 Surfactant with seawater Compatibility Test. In certain embodiments, aqueous gels formed from suitable star macromolecules at a concentration of 1.0 wt. % and has a dynamic viscosity of at least 50 cP in a 0.3 wt. % DOWFAX 2A1 and seawater aqueous solution at a shear rate of 100 s$^{-1}$ at 75° F., according to the DOWFAX 2A1 Surfactant with seawater Compatibility Test, and has a Dynamic Viscosity at 200° F. that is at least 50% relative to the viscosity of the gel at 75° F., according to the Temperature Stability Test, for example, a dynamic viscosity at 200° F. that is at least 60% relative to the viscosity of the gel at 75° F., such as at least 70%; at least 75%; at least 80%; at least 85%; or at least 90%, relative to the viscosity of the gel at 75° F., according to the Temperature Stability Test; or is greater than the viscosity of the gel at 75° F., according to the Temperature Stability Test.

In certain embodiments, the viscosity of an aqueous gel (e.g., a clear, homogeneous aqueous gel) which was prepared by suitable star macromolecules, or a method of making or using the same, and specified surfactant, according to the Sample Preparation Procedure, may be decreased to no higher than 100 cP by a suitable breaker at temperature of 150° F., for example, no higher than 90 cP, no higher than 80 cP, no higher than 70 cP, no higher than 60 cP, no higher than 50 cP, no higher than 40 cP or no higher than 30 cP, according to the Breaker Test.

A suitable breaker may include, but was not limited to, ammonium persulfates, sodium persulfates, hydrogen peroxide, hydrogen peroxide and tetraacetylethylenediamine blending, magnesium peroxide, magnesium oxide, sodium hypochlorite, sodium chlorite, sodium chloride, calcium chloride, magnesium chloride.

In certain embodiments, suitable star macromolecules, or a method of making or using the same, may form an aqueous gel (e.g., a clear, homogeneous aqueous gel) at a concentration of 2.0 wt. % and has a dynamic viscosity of at least 30,000 cP in 5.0 wt. % DOWFAX 2A1 aqueous solution at a shear rate of 0.22 s$^{-1}$ at 25° C., according to the DOWFAX 2A1 Surfactant Compatibility Test, for example, has a dynamic viscosity of at least 20,000 cP, such as at least 30,000 cP; at least 40,000 cP; at least 50,000 cP, according to the DOWFAX 2A1 Surfactant Compatibility Test.

EXAMPLES

TABLE 1

| Abbreviation | Name | Form | Purity | Commercial Source |
|---|---|---|---|---|
| St | styrene | liquid | 99% | Sigma Aldrich |
| MMA | methyl methacrylate | liquid | 99% | Sigma Aldrich |
| tBA | tert-butyl acrylate | liquid | 98% | Sigma Aldrich |
| AA | acrylic acid (formed by deprotection) | NA | NA | NA |
| Me6TREN | tris[2-(dimethylamino)ethyl]amine | liquid | 95% | ATRP Solutions |
| PMDETA | N,N,N',N'',N''-Pentamethyldiethylenetriamine | liquid | 99% | Sigma Aldrich |
| DVB | divinylbenzene | liquid | 80% | Sigma Aldrich |
| FA | formic acid | liquid | 99% | Sigma Aldrich |
| THF | tetrahydrofuran | liquid | 99.9% | Sigma Aldrich |
| NaOH | sodium hydroxide | solid | 98% | Sigma Aldrich |

TABLE 1-continued

| Abbreviation | Name | Form | Purity | Commercial Source |
|---|---|---|---|---|
| EBiB | ethyl α-bromoisobutyrate | liquid | 98% | Sigma Aldrich |
| DEBMM | diethyl 2-bromo-2-methylmalonate | liquid | 98% | Sigma Aldrich |
|  | anisole | liquid | 99% | Sigma Aldrich |
| KCl | potassium chloride | solid | 99.7% | Fisher Chemical |
| V-65 | 2,2'-Azobis (2,4-dimethylvaleronitrile) | solid | 99% | Wako |
| HCl | hydrochloric acid | liquid | 37% | Sigma Aldrich |
| SMA | Stearyl methacrylate | Solid | 80% | Sigma Aldrich |

Equipments

The viscosity measurements reported in the examples detailed below were determined utilizing a Chandler 5550 Viscometer, which utilized a R1 rotor and B35 bob; can be used at maximum sample temperature of 500° F. and pressure of 2000 psi; can be used in shear rate range of 0.09 s$^{-1}$ to 850 s$^{-1}$.

The viscosity measurements reported in the examples detailed below were determined utilizing a BROOKFIELD®7 LVDV-E Viscometer, which utilized the following spindle:

LVDVE SC4-25—providing a shear rate (sec$^{-1}$) of 0.22 N per rpm; can be used in samples having a viscosity range of 800-1.6M cP.

Synthesis of Star Copolymers (Example 1)

Synthesis of [((MMA)$_{18}$-co-(SMA)$_4$)-b-(AA)$_{666}$]/[(MMA)$_{12}$-b-(AA)$_{666}$]/[(AA)$_{51}$] Star (Molar Ratio of Arms: 0.098/0.0425/0.8)

Figure 6:
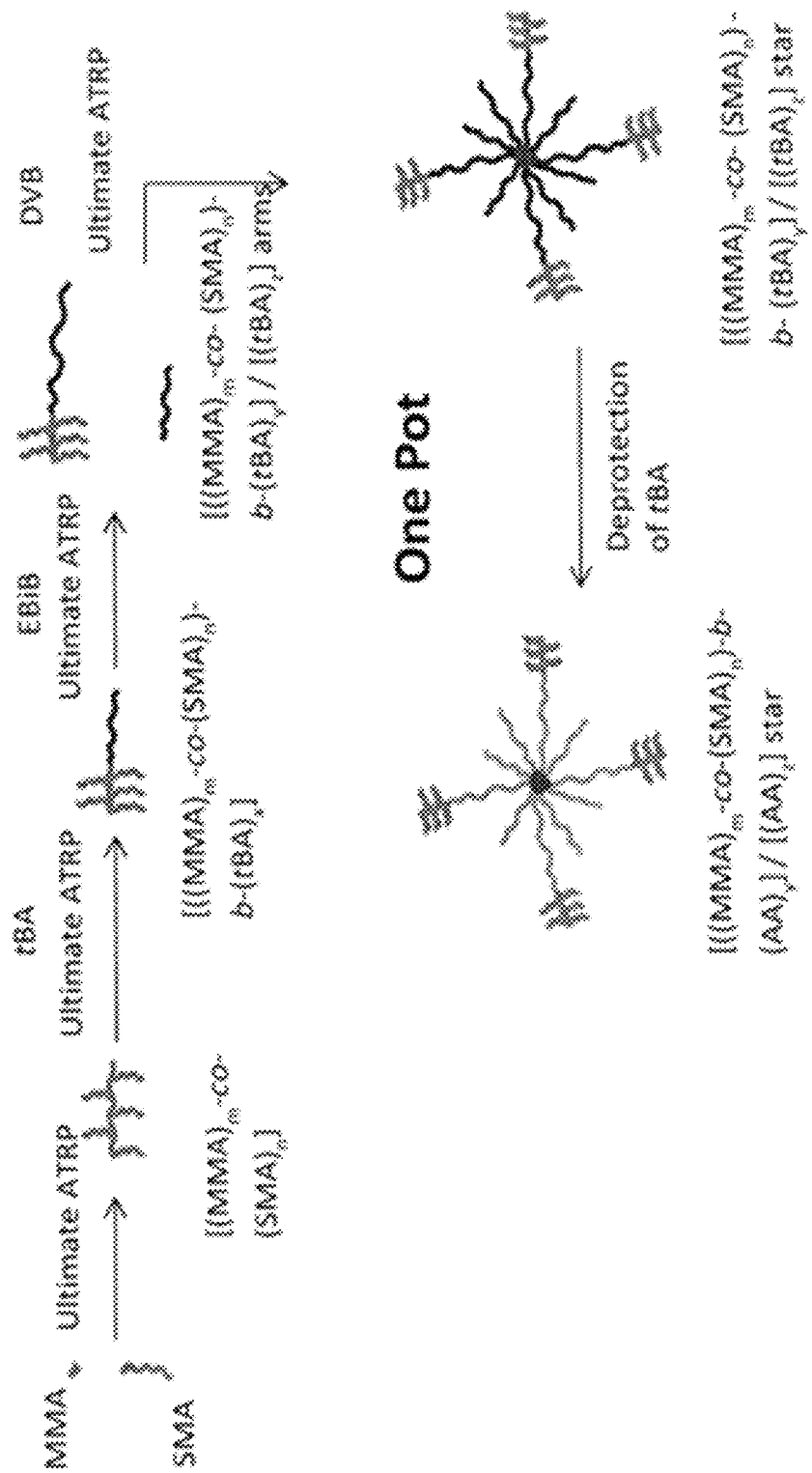
FIG. 6. Depiction of a scheme for the synthesis of $[((MMA)_m\text{-CO-}(SMA)_n)\text{-b-}(AA)_y]/[(AA)_z]$ miktoarm stars copolymers.

The "one-pot" procedure was used for the preparation of a poly(acrylic acid) based miktoarm star macromolecule which is identified herein as Scheme 1 and is similar to that depicted in FIG. 6. The miktoarm star macromolecule with [((MMA)$_{18}$-CO-(SMA)$_4$)-b-(AA)$_{666}$], [(MMA)$_{12}$-b-(AA)$_{666}$], and [(AA)$_{51}$] arms (molar ratio of arms: 0.098/0.0425/0.8) was prepared as depicted in FIG. 6.

Step 1: Synthesis of a Poly(methyl methacrylate)-co-Poly(stearyl methacrylate) Macroinitiator [(MMA)$_{18}$-co-(SMA)$_4$] and Poly(methyl methacrylate) Macroinitiator [(MMA)$_{21}$]

Macroinitiator [(MMA)$_{18}$-co-(SMA)$_4$] was synthesized by using Ultimate ATRP®. The molar ratio of reagents used was: MMA/SMA/DEBMM/CuBr$_2$/CuBr/PMDETA/V-65/anisole=22/5.5/1/0.0048/0.0112/0.042/0.0024/0.52. In a 1000 mL flask, MMA (234 g), SMA (197.83 g), and DEBMM (26.89 g), were added to anisole (130 mL). Then a pre-mixed solution of CuBr$_2$ (0.1139 g)/PMDETA (0.3095 g) and acetone (8 mL) was added into the reactor. The reactor was sealed with a rubber septum and the resulting solution was purged with nitrogen for 1 hour. While the solution is at 72° C., with nitrogen sweep, the solution of CuBr (0.1707 g), PMDETA (0.4638 g), V-65 (0.0628 g) and acetone (60 mL) was fed into the reaction solution at the rate of 8 mL/h. After 10 hours, the reaction was quenched by air sparging, the polymer solution was collected for use, and the molecular weight was measured by GPC. The Mn is 3761 g/mol and PDI is 1.19. Yield: 680 grams of polymer solution with 55 wt. % of polymer content was obtained.

Macroinitiator [(MMA)$_{12}$] was synthesized by using Ultimate ATRP®. The molar ratio of reagents is: MMA/DEBMM/CuBr/CuBr$_2$/PMDETA/V-65/anisole=15/1/0.0448/0.0048/0.186/0.00238/5.88. To a 1 L reactor was added MMA (280.8 g), DEBMM (47.32 g), and anisole (150 mL), then a pre-mixed solution of CuBr$_2$ (0.20 g)/PMDETA (0.703 g) and acetone (8 mL) was added into the reactor. The reactor was sealed with a rubber septum and the resulting solution was purged with nitrogen for 1 hour. While the solution is at 72° C., with nitrogen sweep, the solution of CuBr (1.2016 g), PMDETA (5.44 g), V-65 (0.11 g) and acetone (160 mL) was fed into the reaction solution at the rate of 15 mL/h. After 10 hours, the reaction was quenched by air sparging, the polymer solution was collected for use, and the molecular weight was measured by GPC. The Mn is 1461 g/mol and PDI is 1.11. Yield: 400 grams of polymer solution with 52 wt. % of polymer content was obtained.

Steps 2-4: Synthesis of [((MMA)$_{18}$-co-(SMA)$_4$)-b-(tBA)$_{666}$]/[(MMA)$_{12}$-b-(tBA)$_{666}$]/[(tBA)$_{51}$] Arms, Crosslinking and Deprotection to Produce [((MMA)$_{18}$-co-(SMA)$_4$)-b-(AA)$_{666}$]/[(MMA)$_{12}$-b-(AA)$_{666}$]/[(AA)$_{51}$] Star Copolymer in "One Pot"

The synthesis includes 3 steps: the synthesis of arms, the cross-linking of arms and the deprotection of star polymers. The molar ratio of reagents is: tBA/[(MMA)$_{18}$-co-(SMA)$_4$]/[(MMA)$_{12}$]/EBiB/CuBr$_2$/CuBr/Me$_6$TREN/V-65/DVB/Anisole=160/0.098/0.0425/0.8/0.01/0.024/0.102/0.1104/18.225/325. Anisole was used as solvent. The synthesis of arms was conducted as follows. 4238 g (33.07 mol) tert-butylacrylate (tBA), 7264 g anisole, 24.7 g polymethylmethacrylate (PMMA) macroinitiator, 138.62 g poly (stearylmethacrylate-co-methylmethacrylate) (PSMA-co-PMMA) macroinitiator were charged into a 20 L reactor. An acetone solution of Cu(II) complex was prepared by first dissolving 461.6 mg (2.067 mmol) CuBr$_2$ into 1.6 mL deionized water, then transferring the water solution dropwise to a 60 mL acetone solution containing 0.825 mL (3.125 mmol) Tris[2-(dimethylamino)ethyl]amine (Me$_6$TREN). The acetone solution of Cu(II) complex was added into the 20 L reactor and the combined solution was purged by nitrogen with stirring for at least 40 minutes. The feeding solution was prepared according to the following procedure: 5.0 mL (18.95 mmol) Me$_6$TREN was added into 625.8 g oxygen-free acetone, the solution was degassed for 10 minutes by nitrogen prior to the addition of 7.371 g (29.68 mmol) V-65, the solution was again degassed for 10 minutes followed by the addition of 925 mg (6.449 mmol) of CuBr. The feeding solution was kept cold in an ice-water bath throughout the entire reaction time. After nitrogen purging in the 20 L reactor is finished, the temperature of the reaction mixture was brought up to 78° C. Start pumping the feeding solution at a rate of 0.70 g/min to start the polymerization. Reaction temperature should be carefully controlled to be no higher than 83° C. in the event of an exotherm. The reaction progress was monitored by gas chromatography (GC) and gel permeation chromatography (GPC). 32.24 g (0.1653 mol) oxygen-free Ethyl 2-bromoisobutyrate (EBiB) was charged into the reaction mixture when tBA conversion hits 68%. 490 g (3.764 mol) divinylbenzene (DVB) was added to the reaction when tBA conversion is higher than 86%. The reaction temperature was increased to 95° C. and the feeding rate was increased to 1.2 g/min. The polymerization was stopped at 78% DVB conversion by stopping pumping the feeding solution and purging with air for 15 minutes while adding 600 g of anisole to decrease the viscosity of the final solution. Molecular weight of [((MMA)$_{18}$-co-(SMA)$_4$)-b-(tBA)$_{666}$]/[(MMA)$_{12}$-b-(1BA)$_{666}$]/[(tBA)$_{51}$] star molecule was determined by GPC. Mn=70632 g/mol, Mp=205746 g/mol, PDI=4.72. To deprotect the [((MMA)$_{18}$-co-(SMA)$_4$)-b-(tBA)$_{666}$]/[(MMA)$_{12}$-b-(tBA)$_{666}$]/[(tBA)$_{51}$] star molecule, 4930 g (103.9 mol) formic acid and 400 mL (4.660 mol) of concentrated hydrochloric acid were charged into the reactor after the solution was cooled down to 56° C. The reaction mixture was heated back up again to 70° C. and stirred vigorously for 2 hours and 40 minutes. The resulted deprotected star polymer was isolated by filtration and washed with 8 L of acetone. The yield of [((MMA)$_{18}$-co-(SMA)$_4$)-b-(AA)$_{666}$]/[(MMA)$_{12}$-b-(AA)$_{666}$]/[(AA)$_{51}$] star was 4150 g after drying for 24 hours in a vacuum oven at 80° C.

Properties of Star Copolymer (Examples 2-5)

The thickening property (influence on viscosity) and shear thinning property of aqueous solutions (water or seawater) containing invented compositions was investigated.

Example 2: Composition 1

0.3 wt. % of DOWFAX 2A1, 1 wt. % of Star polymer (example 1) and 2 wt. % of KCl

A gel from an aqueous 0.3 wt. % DOWFAX 2A1 solution containing 1 wt. % of a thickening agent (e.g., star macromolecule synthesized in Example 1, [((MMA)$_{18}$-co-(SMA)$_4$)-b-(AA)$_{666}$]/[(MMA)$_{12}$-b-(AA)$_{666}$]/[(AA)$_{51}$] star, and 2 wt. % of KCl, was formed according to the DOWFAX 2A1 Surfactant with KCl Compatibility Procedure:

Add 384 mL of tap water to a Waring Blender. Then add 1.76 ml of 50% aqueous NaOH to the blender. Mix at high shear for 30 seconds. With stirring, add 4 g of Star polymer (example 1) to the blender and stir for 10 minutes. Add 8 g of KCl to the gel and stir for 3 minutes. Stop stirring and add 1.2 g of DOWFAX 2A1 to the blender. Gently stir with a spatula. Let the gel sit for 30 minutes before testing.

The viscosity of the sample gels vs. shear rate was measured according to Dynamic Viscosity at Programmed Temperature Test Procedure. The results are presented in FIG. 1.

Example 3: Composition 2

2.0 wt. % DOWFAX 2A1, 4.0 wt. % Star polymer (example 1) in seawater

A gel from an aqueous 2.0 wt. % DOWFAX 2A1 solution containing 4.0 wt. % of a thickening agent (e.g., star macromolecule synthesized in Example 1, [((MMA)$_{18}$-co-(SMA)$_4$)-b-(AA)$_{666}$]/[(MMA)$_{12}$-b-(AA)$_{666}$]/[(AA)$_{51}$] star, and seawater, was formed according to the DOWFAX 2A1 Surfactant with Seawater Compatibility Procedure:

Add 365 ml of seawater to a Waring Blender. Then add 7.04 ml of 50% aqueous NaOH to the blender. Mix at high shear for 30 seconds. With stirring, add 16 g of Star polymer #1 to the blender and stir for 15 minutes. Stop stirring and add 8 g of DOWFAX 2a1 to the blender. Gently stir with a spatula. Let the gel sit for 30 minutes before testing.

Figure 2:
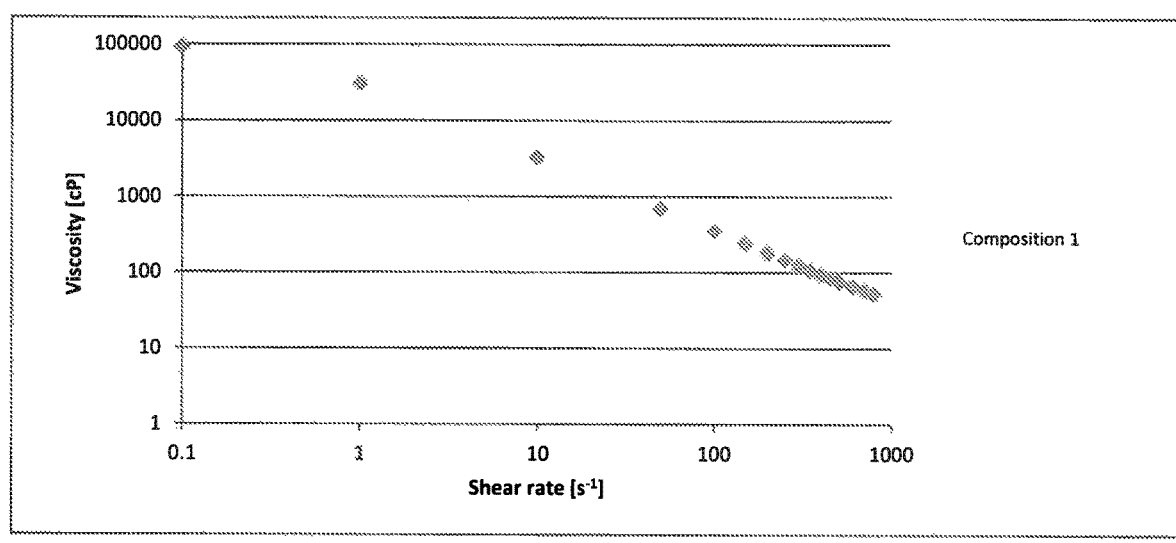
FIG. 2. Viscosity vs. shear rate of aqueous solution of composition 1. (Star macromolecule (from Example 1), DOWFAX2A1 and KCl).

The viscosity of the sample gels vs. shear rate was measured according to Dynamic Viscosity at Programmed Temperature Test Procedure. The results are presented in FIG. 2.

Example 4: Composition 3

0.3 wt. % Dowfax 2A1, 1 wt. % Star polymer (example 1), 2 wt. % KCl and breaker

A gel from an aqueous 0.3 wt. % DOWFAX 2A1 solution containing 1 wt. % of a thickening agent (e.g., star macromolecule synthesized in Example 1, [((MMA)$_{18}$-co-(SMA)$_4$)-b-(AA)$_{666}$]/[(MMA)$_{12}$-b-(AA)$_{666}$]/[(AA)$_{51}$] star, 2 wt. % of KCl and breakers, was formed according to the Breaker Test Procedure:

Add 384 ml tap water to a Waring Blender. Then add 1.76 ml 50% aqueous NaOH to the blender. Mix at high shear for 30 seconds. With stirring, add 4 g of Star polymer #1 to the blender and stir for 10 minutes. Add 8 g of KCl to the gel and stir for 3 minutes. Stop stirring and add 1.2 g of Dowfax 2a1 to the blender. Gently stir with a spatula. Let the gel sit for 30 minutes. Weigh 50 g of the gel in a weighing boat. Add 0.5 g of H$_2$O$_2$(30% active) and 0.018 g of tetra acetyl ethylene diamine (TAED) to the gel and mix well with a spatula. Load the gel to Chandler 5550 for breaker test.

Figure 3:
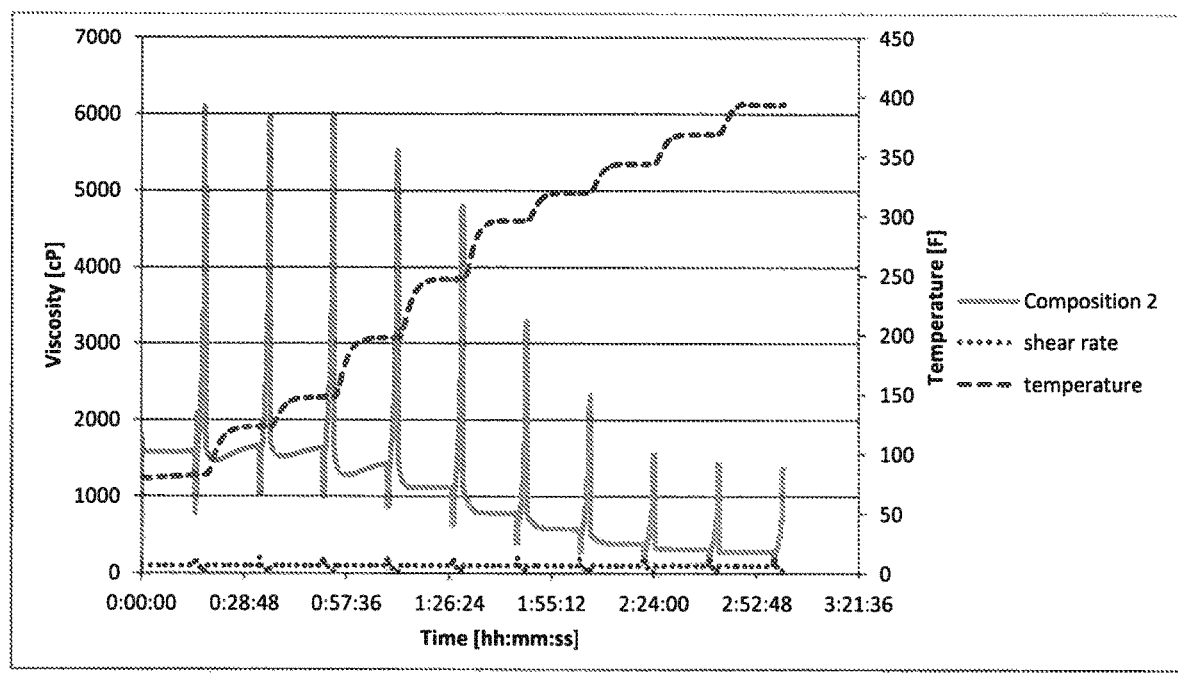
FIG. 3. Viscosity vs. shear rate and temperature of aqueous solution of composition 2. (Star macromolecule (from Example 1), DOWFAX2A1 and seawater).
Figure 4:
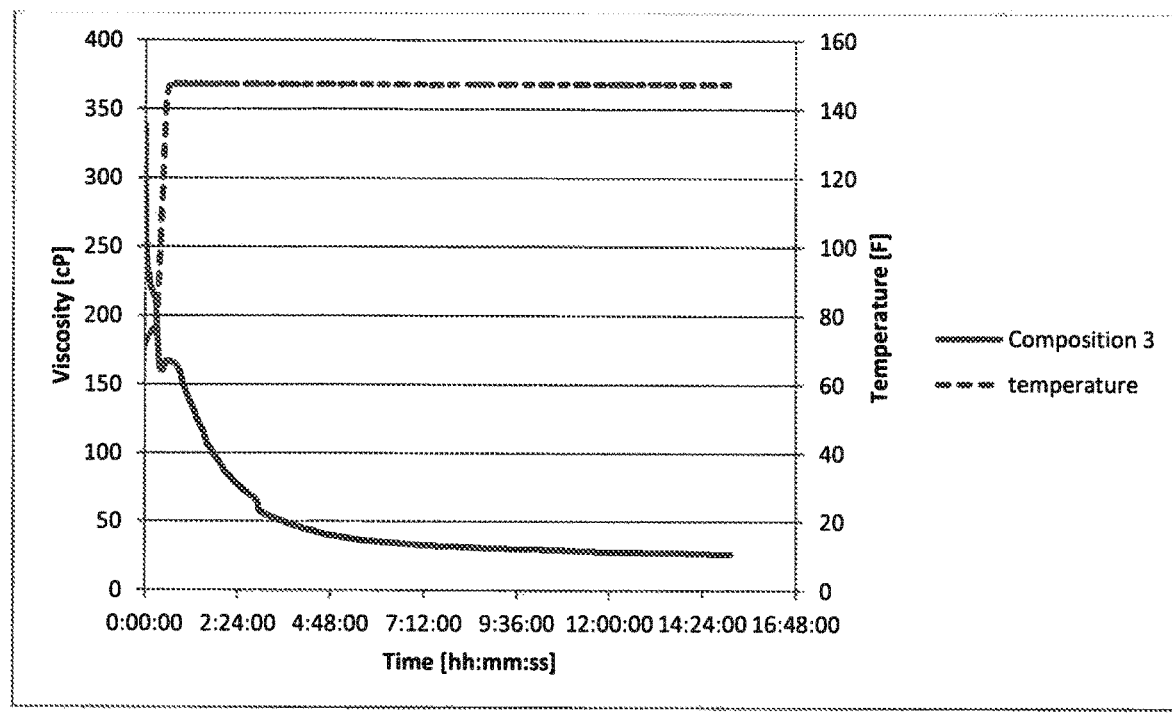
FIG. 4. Decline of viscosity of aqueous solution of composition 3 in breaker test. (Star macromolecule (from Example 1), DOWFAX2A1, KCl and Breakers).
Figure 5:
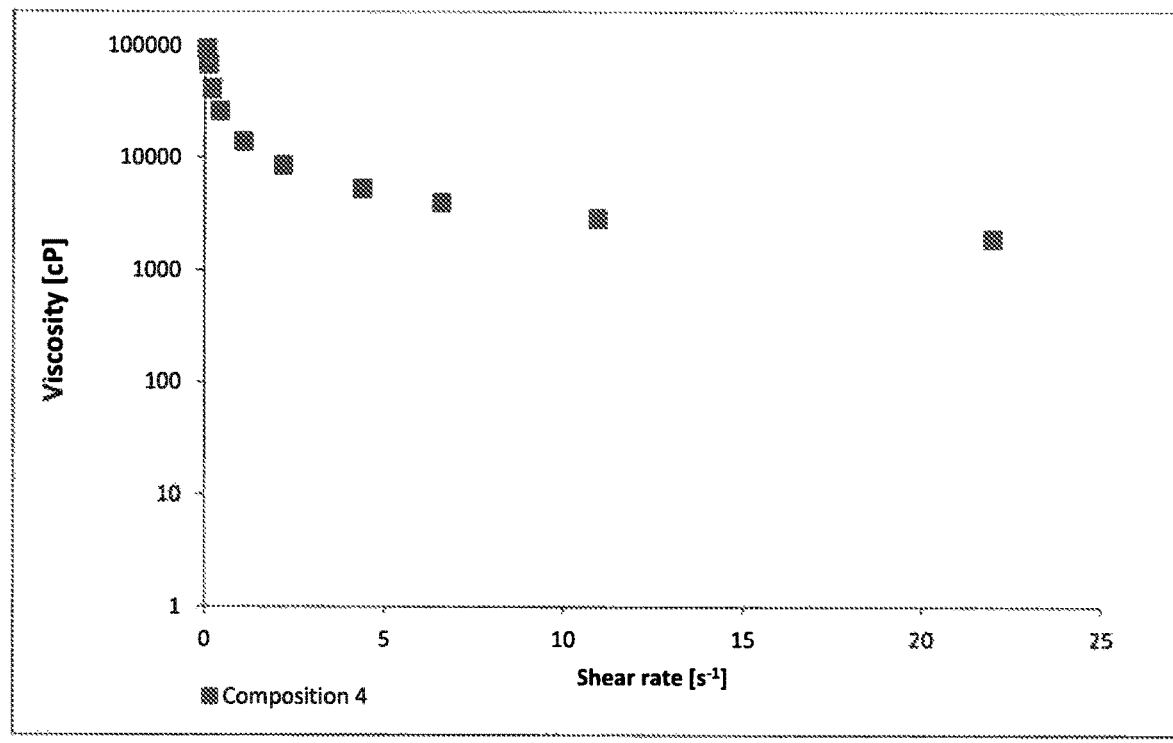
FIG. 5. Viscosity vs. shear rate of aqueous solution of composition 4. (Star macromolecule (from Example 1), DOWFAX2A1).

The viscosity of the sample gels at 100 s$^{-1}$ of shear rate was measured according to Dynamic Viscosity at Breaker Test Procedure. The results are presented in FIG. 3.

Example 5

Composition 4: 2 wt. % Star polymer #1 and 5 wt. % DOWFAX 2A1

Add 184 ml tap water to a Waring Blender. Then add 1.76 ml 50% aqueous NaOH to the blender. Mix at high shear for 30 seconds. With stirring, add 4 g of Star polymer #1 to the blender and stir for 10 minutes. Stop stirring and add 10 g of Dowfax 2a1 to the blender. Gently stir with a spatula. Let the gel sit for 30 minutes before testing.

Test Procedures:

Dynamic Viscosity at Standard Temperature Test Procedure

A portion of the gel prepared according to the Sample Preparation Procedure was transferred to the Chandler 5550 Viscometer equipped with a R1 rotor and B5 bob for mixing at 75° F. and at pressure of 500 psi over a wide range of the shear rate (e.g, 20-200 s$^{-1}$) and viscosity was recorded. Dynamic viscosity at standard temperature was determined as the viscosity in centipoise (cP) at 100 s$^{-1}$ and represented as Viscosity (Std).

Dynamic Viscosity at Programmed Temperature Test Procedure

A portion of the gel prepared according to the Sample Preparation Procedure was transferred to the Chandler 5550 Viscometer equipped with a R1 rotor and B5 bob for mixing at programmed temperature from 75° F. to 400° F. and at pressure of 500 psi over a wide range of the shear rate (e.g., 20-200 s$^{-1}$) and viscosity was recorded. Temperature is set at 75° F., 125° F., 150° F., 200° F., 250° F., 275° F., 300° F., 325° F. and 350° F. Viscosity measurements were taken every 5 seconds in the following sequence of shear rate 200, 100, 80, 60, 40 and 20 s$^{-1}$. Dynamic viscosity at Programmed Temperature was determined as the viscosity in centipoise (cP) and represented as Viscosity (at shear rate, temp), for example, Dynamic viscosity at shear rate of 100 s$^{-1}$ and temperature of 75° F. is represented as Viscosity (at 100 s$^{-1}$, 75° F.); Dynamic viscosity at shear rate of 40 s- and temperature of 100° F. is represented as Viscosity (at 40 s$^{-1}$, 100° F.); Dynamic viscosity at shear rate of 40 s$^{-1}$ and temperature of 100° F. is represented as Viscosity (at 40 s$^{-1}$, 100° F.).

Dynamic Viscosity at Breaker Test Procedure

A portion of the gel prepared according to the Sample Preparation Procedure was transferred to the Chandler 5550 Viscometer equipped with a R$^1$ rotor and B5 bob for mixing at 150° F. and at pressure of 500 psi over a wide range of the shear rate (e.g, 20-200 s$^{-1}$) and viscosity was recorded. Dynamic viscosity at 150° F. was determined as the viscosity in centipoise (cP) at 100 s$^{-1}$.

Shear-Thinning Value at Certain Temperature

A shear-thinning value at certain temperature was determined using values measured during the Dynamic Viscosity at Programmed Temperature Test Procedure, according to the following equation:

$$S(\text{Temp.}) = [(\text{Viscosity (at 40 s}^{-1}\text{,temp)} - \text{Viscosity (at 100 s}^{-1}\text{,temp))} / \text{Viscosity (at 40 s}^{-1}\text{,temp)}] \times 100\%.$$

Wherein S (Temp.) represents the shear-thinning value at certain temperature, for example, S (75° F.) represents the shear-thinning value at 75° F.; S (100° F.) represents the shear-thinning value at 100° F.; S (125° F.) represents the shear-thinning value at 125° F.

Surfactant with KCl Compatibility Test

A portion of the gel prepared according to the DOWFAX 2A1 Surfactant with KCl Compatibility Procedure was transferred to the Chandler 5550 Viscometer equipped with a R1 rotor and B5 bob for mixing at programmed temperature from 75° F. to 350° F. and at pressure of 500 psi over a wide range of the shear rate (e.g, 20-200 s$^{-1}$) and viscosity was recorded.

Surfactant with Seawater Compatibility Test

A portion of the gel prepared according to the DOWFAX 2A1 Surfactant with Seawater Compatibility Procedure was transferred to the Chandler 5550 Viscometer equipped with a R1 rotor and B5 bob for mixing at programmed temperature from 75° F. to 350° F. and at pressure of 500 psi over a wide range of the shear rate (e.g., 20-200 s$^{-1}$) and viscosity was recorded.

Surfactant Compatibility Test

A portion of the gel prepared according to the DOWFAX 2A1 Surfactant with Seawater Compatibility Procedure was transferred to the BROOKFIELD® LVDV-E Viscometer equipped with a Spindle LVDVE SC4-25 for mixing at 25° C. and at standard pressure (i.e., at STP), and viscosity was recorded.

Tolerance to Temperature Value

A tolerance to temperature value was determined using values measured during the Dynamic Viscosity Test Procedure and shear thinning value calculated during the Shear-Thinning Value at certain Temperature, according to the following equations:

$$\text{Tol(Temp.)} = S(\text{Temp.})/S(100° \text{F.}) \times 100\%.$$

Wherein Tol (Temp.) represents the Tolerance to Temperature Value at certain temperature, for example, Tol (75° F.) represents the Tolerance to Temperature Value at 75° F.; Tol (100° F.) represents the Tolerance to Temperature Value at 100° F.; Tol (125° F.) represents the Tolerance to Temperature Value at 125° F.

Breaker Test

Heat the sample to 75° F. and keep at 75° F. with shear rate at 100 s$^{-1}$ for 15 minutes. Heat up to 150° F. (or 180° F.) within 15 minutes. Keep the temperature at 150° F. (or 180° F.) with shear rate at 100 s$^{-1}$ for 15 hours.

Temperature Stability Test

A portion of the gel prepared according to the DOWFAX 2A1 Surfactant with KCl Compatibility Procedure was transferred to the Chandler 5550 Viscometer equipped with a R1 rotor and B5 bob for mixing at programmed temperature from 75° F. to 350° F. and at pressure of 500 psi over a wide range of the shear rate (e.g, 20-200 $s^{-1}$) and viscosity was recorded. The temperature Stability Value, in percent, is determined as the viscosity in centipoise (cP) at 100 $s^{-1}$ at 75 and 200° F. following the equation:

$$[1-(\text{Viscosity (at 100 s}^{-1},75°\text{ F.})-\text{Viscosity (at 100 s}^{-1},200°\text{ F.}))/\text{Viscosity (at 100 s}^{-1},75°\text{ F.})]\times 100\%.$$

Exemplary Embodiments

In an embodiment, a composition comprises at least one sulfonated surfactant composition and one or more star macromolecules having a core and a plurality of polymeric arms, wherein:
  a) at least one polymeric arm of the plurality of polymeric arms is a hydrophilic polymeric arm;
  b) at least one polymeric arm of the plurality of polymeric arms is a copolymeric arm, wherein the at least one copolymeric arm:
    1) comprises a longer hydrophilic segment proximal to the core and a shorter hydrophobic segment distal to the core; and
    2) has a greater degree of polymerization than the at least one hydrophilic polymeric arm In certain embodiments, one or more than one (including for instance all) of the following further embodiments may comprise each of the other embodiments or parts thereof.

In a further embodiment, the composition of any one of the above embodiments and any one or more of the further embodiments herein, wherein the composition is a gel or a fluid.

In a further embodiment, the composition of any one of the above embodiments and any one or more of the further embodiments herein, wherein the composition is used as an oilfield chemical.

In a further embodiment, the composition of any one of the above embodiments and any one or more of the further embodiments herein, wherein the at least one sulfonated surfactant composition comprises any mixture of any number of the following: Benzene, 1,1-oxybis-, tetrapropylene derivatives, sulfonated, sodium salts; Benzenesulfonic acid, branched dodecyl(sulfophenoxy), disodium salt; Disodium oxybis(dodecylbenzenesulfonate); Disodium dodecyl(sulfophenoxy)-benzenesulfonate; Sodium dodecyl(phenoxy)-benzenesulfonate; Sodium oxybis(dodecylbenzene)sulfonate; Benzenesulfonic acid, branched dodecyl-, (branched dodecyl phenoxy), sodium salt; Benzenesulfonic acid, phenoxy, branched dodecyl-, sodium salt; Benzenesulfonic acid, oxybis(branched dodecyl-), disodium salt; Disodium oxybis(dodecylbenzenesulfonate); Disodium dodecyl(sulfophenoxy)-benzenesulfonate; Sodium dodecyl (phenoxy)-benzenesulfonate; Disodium dodecyl(sulfophenoxy)-benzenesulfonate, C10 (Linear) Sodium Diphenyl Oxide Disulfonate, C16 (Linear) Sodium Diphenyl Oxide Disulfonate, C6 (Linear) Diphenyl Oxide Disulfonic Acid, C12 (Branched) Sodium Diphenyl Oxide Disulfonate, C12 (Branched) Diphenyl Oxide Disulfonic Acid, C12 (Branched) Diphenyl Oxide Disulfonic Acid and Sodium alkyl diphenyl oxide sulfonate.

In a further embodiment, the composition of any one of the above embodiments and any one or more of the further embodiments herein, wherein when 1.0 wt. % of the star macromolecule and 0.3 wt. % of the at least one sulfonated surfactant composition forms a homogeneous gel and has a dynamic viscosity of at least 50 cP at a shear rate of 100 $s^{-1}$ at 75° F., according to the Surfactant with KCl Compatibility Test.

In a further embodiment, the composition of any one of the above embodiments and any one or more of the further embodiments herein, wherein when 1.0 wt. % of the star macromolecule and 0.3 wt. % of the at least one sulfonated surfactant composition forms a homogeneous gel and has a dynamic viscosity of at least 50 cP at a shear rate of 100 $s^{-1}$ at 75° F., according to the Surfactant with KCl Compatibility Test, and has a Dynamic Viscosity at 200° F. that is at least 50% relative to the viscosity of the gel at 75° F., according to the Temperature Stability Test.

In a further embodiment, the composition of any one of the above embodiments and any one or more of the further embodiments herein, wherein when 2.0 wt. % of the star macromolecule and 5.0 wt. % of the at least one sulfonated surfactant composition forms a homogeneous gel and has a dynamic viscosity of at least 30,000 cP in 5.0 wt. % sulfonated surfactant composition aqueous solution at a shear rate of 0.22 $s^{-1}$ at 25° C., according to the Surfactant Compatibility Test.

In a further embodiment, the composition of any one of the above embodiments and any one or more of the further embodiments herein, wherein the at least one sulfonated surfactant composition comprises 2-100 wt. % of an anionic sulfonated surfactant.

In a further embodiment, the composition of any one of the above embodiments and any one or more of the further embodiments herein, wherein the at least one sulfonated surfactant composition comprises at least 2 wt. % of an anionic sulfonated surfactant.

In a further embodiment, the composition of any one of the above embodiments and any one or more of the further embodiments herein, wherein the at least one sulfonated surfactant composition comprises at least 5 wt. % of an anionic sulfonated surfactant.

In a further embodiment, the composition of any one of the above embodiments and any one or more of the further embodiments herein, wherein the at least one sulfonated surfactant composition comprises at least 10 wt. % of an anionic sulfonated surfactant.

In a further embodiment, the composition of any one of the above embodiments and any one or more of the further embodiments herein, wherein the at least one sulfonated surfactant composition comprises at least 15 wt. % of an anionic sulfonated surfactant.

In a further embodiment, the composition of any one of the above embodiments and any one or more of the further embodiments herein, wherein the at least one sulfonated surfactant composition comprises at least 20 wt. % of an anionic sulfonated surfactant.

In a further embodiment, the composition of any one of the above embodiments and any one or more of the further embodiments herein, wherein the at least one sulfonated surfactant composition comprises at least 40 wt. % of an anionic sulfonated surfactant.

In a further embodiment, the composition of any one of the above embodiments and any one or more of the further embodiments herein, wherein the at least one sulfonated surfactant composition comprises at least 50 wt. % of an anionic sulfonated surfactant.

In a further embodiment, the composition of any one of the above embodiments and any one or more of the further embodiments herein, wherein the at least one sulfonated surfactant composition comprises at least 75 wt. % of an anionic sulfonated surfactant.

In a further embodiment, the composition of any one of the above embodiments and any one or more of the further embodiments herein, wherein the at least one sulfonated surfactant composition comprises at least 90 wt. % of an anionic sulfonated surfactant.

In a further embodiment, the composition of any one of the above embodiments and any one or more of the further embodiments herein, wherein the at least one sulfonated surfactant composition comprises at least 95 wt. % of an anionic sulfonated surfactant.

In a further embodiment, the composition of any one of the above embodiments and any one or more of the further embodiments herein, wherein the at least one sulfonated surfactant composition comprises 100 wt. % of an anionic sulfonated surfactant.

In a further embodiment, the composition of any one of the above embodiments and any one or more of the further embodiments herein, wherein the anionic sulfonated surfactant comprises or consists of anionic sulfonated surfactant an represented by Formula I, Formula II, Formula III, or Formula IV:

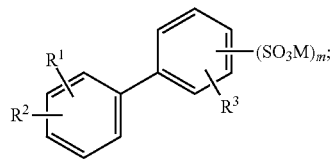

Formula I

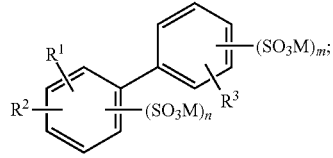

Formula II

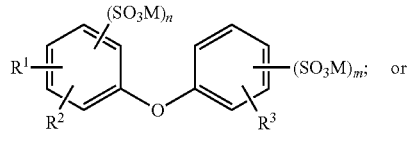

Formula III

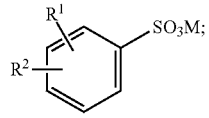

Formula IV wherein:
- $R^1$—represents a hydrogen, or a linear or branched $C_6$-$C_{24}$ alkyl;
- $R^2$—represents a hydrogen, or a linear or branched $C_6$-$C_{24}$ alkyl;
- $R^3$—represents a hydrogen, or a linear or branched $C_6$-$C_{24}$ alkyl;
- M—represents an alkali metal, an ammonium represented by $N(R^4)_4$, or an aminoalcohol, or $SO_3M$ is $SO_3H$; wherein $R^4$ independently represents a hydrogen, or a linear or branched $C_3$-$C_6$ alkyl;
- m—represents an integer of 1 or 2; and
- n—represents an integer of 0 or 1; and
wherein at least one and no more than two of $R^1$, $R^2$, and $R^3$, represents a linear or branched $C_6$-$C_{24}$ alkyl.

In a further embodiment, the composition of any one of the above embodiments and any one or more of the further embodiments herein, wherein the anionic sulfonated surfactant comprises or consists of anionic sulfonated surfactant an represented by Formula I.

In a further embodiment, the composition of any one of the above embodiments and any one or more of the further embodiments herein, wherein m represents an integer of 1.

In a further embodiment, the composition of any one of the above embodiments and any one or more of the further embodiments herein, wherein m represents an integer of 2.

In a further embodiment, the composition of any one of the above embodiments and any one or more of the further embodiments herein, wherein the anionic sulfonated surfactant comprises or consists of anionic sulfonated surfactant an represented by Formula II.

In a further embodiment, the composition of any one of the above embodiments and any one or more of the further embodiments herein, wherein the anionic sulfonated surfactant comprises or consists of anionic sulfonated surfactant an represented by Formula III.

In a further embodiment, the composition of any one of the above embodiments and any one or more of the further embodiments herein, wherein the anionic sulfonated surfactant comprises or consists of anionic sulfonated surfactant an represented by Formula I, Formula II, or Formula III, and wherein:
i) $R^1$ represents a linear or branched $C_4$-$C_8$ alkyl, a linear or branched $C_6$-$C_{10}$ alkyl, a linear or branched $C_8$-$C_{14}$ alkyl, a linear or branched $C_{12}$-$C_{16}$ alkyl, a linear or branched $C_{14}$-$C_{18}$ alkyl, a linear or branched $C_{16}$-$C_{20}$ alkyl, or a linear or branched $C_{18}$-$C_{24}$ alkyl; and
ii) $R^2$ and $R^3$ represent a hydrogen.

In a further embodiment, the composition of any one of the above embodiments and any one or more of the further embodiments herein, wherein the anionic sulfonated surfactant comprises or consists of anionic sulfonated surfactant an represented by Formula I, Formula II, or Formula III, and wherein:
i) $R^1$ represents a linear or branched $C_6$ alkyl, a linear or branched $C_{10}$ alkyl, or a linear or branched $C_{12}$ alkyl; and
ii) $R^2$ and $R^3$ represent a hydrogen.

In a further embodiment, the composition of any one of the above embodiments and any one or more of the further embodiments herein, wherein the anionic sulfonated surfactant comprises or consists of anionic sulfonated surfactant an represented by Formula I, Formula II, or Formula III, and wherein:
i) $R^1$ and $R^3$ represent a hydrogen; and
ii) $R^2$ represents a linear or branched $C_4$-$C_8$ alkyl, a linear or branched $C_6$-$C_{10}$ alkyl, a linear or branched $C_5$-$C_{14}$ alkyl, a linear or branched $C_{12}$-$C_{16}$ alkyl, a linear or branched $C_{14}$-$C_{18}$ alkyl, a linear or branched $C_{16}$-$C_{20}$ alkyl, or a linear or branched $C_{18}$-$C_{24}$ alkyl.

In a further embodiment, the composition of any one of the above embodiments and any one or more of the further embodiments herein, wherein the anionic sulfonated surfactant comprises or consists of anionic sulfonated surfactant an represented by Formula I, Formula II, or Formula III, and wherein:
i) $R^1$ and $R^3$ represent a hydrogen; and
ii) $R^2$ represents a linear or branched $C_6$ alkyl, a linear or branched $C_{10}$ alkyl, or a linear or branched $C_{12}$ alkyl.

In a further embodiment, the composition of any one of the above embodiments and any one or more of the further embodiments herein, wherein the anionic sulfonated surfactant comprises or consists of anionic sulfonated surfactant an represented by Formula I, Formula II, or Formula III, and wherein:
i) $R^1$ and $R^2$ represent a hydrogen; and
ii) $R^3$ represents a linear or branched $C_4$-$C_8$ alkyl, a linear or branched $C_6$-$C_{10}$ alkyl, a linear or branched $C_8$-$C_{14}$ alkyl, a linear or branched $C_{12}$-$C_{16}$ alkyl, a linear or branched $C_{14}$-$C_{18}$ alkyl, a linear or branched $C_{16}$-$C_{20}$ alkyl, or a linear or branched $C_{18}$-$C_{24}$ alkyl.

In a further embodiment, the composition of any one of the above embodiments and any one or more of the further embodiments herein, wherein the anionic sulfonated surfactant comprises or consists of anionic sulfonated surfactant an represented by Formula I, Formula II, or Formula III, and wherein:
i) $R^1$ and $R^2$ represent a hydrogen; and
ii) $R^3$ represents a linear or branched $C_6$ alkyl, a linear or branched $C_{10}$ alkyl, or a linear or branched $C_{12}$ alkyl.

In a further embodiment, the composition of any one of the above embodiments and any one or more of the further embodiments herein, wherein the anionic sulfonated surfactant comprises or consists of anionic sulfonated surfactant an represented by Formula I, Formula II, or Formula III, and wherein:
i) $R^1$ and $R^2$ independently represents a linear or branched $C_4$-$C_8$ alkyl, a linear or branched $C_6$-$C_{10}$ alkyl, a linear or branched $C_8$-$C_{14}$ alkyl, a linear or branched $C_{12}$-$C_{16}$ alkyl, a linear or branched $C_{14}$-$C_{18}$ alkyl, a linear or branched $C_{16}$-$C_{20}$ alkyl, or a linear or branched $C_{18}$-$C_{24}$ alkyl; and
ii) $R^3$ represent a hydrogen.

In a further embodiment, the composition of any one of the above embodiments and any one or more of the further embodiments herein, wherein the anionic sulfonated surfactant comprises or consists of anionic sulfonated surfactant an represented by Formula I, Formula II, or Formula III, and wherein:
i) $R^1$ and $R^2$ independently represents a linear or branched $C_6$ alkyl, a linear or branched $C_{10}$ alkyl, or a linear or branched $C_{12}$ alkyl; and
ii) $R^3$ represent a hydrogen.

In a further embodiment, the composition of any one of the above embodiments and any one or more of the further embodiments herein, wherein the anionic sulfonated surfactant comprises or consists of anionic sulfonated surfactant an represented by Formula I, Formula II, or Formula III, and wherein:
i) $R^1$ and $R^3$ independently represents a linear or branched $C_4$-$C_8$ alkyl, a linear or branched $C_6$-$C_{10}$ alkyl, a linear or branched $C_8$-$C_{14}$ alkyl, a linear or branched $C_{12}$-$C_{16}$ alkyl, a linear or branched $C_{14}$-$C_{18}$ alkyl, a linear or branched $C_{16}$-$C_{20}$ alkyl, or a linear or branched $C_{18}$-$C_{24}$ alkyl; and
ii) $R^2$ represent a hydrogen.

In a further embodiment, the composition of any one of the above embodiments and any one or more of the further embodiments herein, wherein the anionic sulfonated surfactant comprises or consists of anionic sulfonated surfactant an represented by Formula I, Formula II, or Formula III, and wherein:
i) $R^1$ and $R^3$ independently represents a linear or branched $C_6$ alkyl, a linear or branched $C_{10}$ alkyl, or a linear or branched $C_{12}$ alkyl; and
ii) $R^2$ represent a hydrogen.

In a further embodiment, the composition of any one of the above embodiments and any one or more of the further embodiments herein, wherein the anionic sulfonated surfactant comprises or consists of anionic sulfonated surfactant an represented by Formula I, Formula II, or Formula III, and wherein:
i) $R^1$ represent a hydrogen; and
ii) $R^2$ and $R^3$ independently represents a linear or branched $C_4$-$C_8$ alkyl, a linear or branched $C_6$-$C_{10}$ alkyl, a linear or branched $C_8$-$C_{14}$ alkyl, a linear or branched $C_{12}$-$C_{16}$ alkyl, a linear or branched $C_{14}$-$C_{18}$ alkyl, a linear or branched $C_{16}$-$C_{20}$ alkyl, or a linear or branched $C_{18}$-$C_{24}$ alkyl.

In a further embodiment, the composition of any one of the above embodiments and any one or more of the further embodiments herein, wherein the anionic sulfonated surfactant comprises or consists of anionic sulfonated surfactant an represented by Formula I, Formula II, or Formula III, and wherein:
i) $R^1$ represent a hydrogen; and
ii) $R^2$ and $R^3$ independently represents a linear or branched $C_6$ alkyl, a linear or branched $C_{10}$ alkyl, or a linear or branched $C_{12}$ alkyl.

In a further embodiment, the composition of any one of the above embodiments and any one or more of the further embodiments herein, wherein the anionic sulfonated surfactant comprises or consists of anionic sulfonated surfactant an represented by Formula I, Formula II, or Formula III, and wherein n represents an integer of 0.

In a further embodiment, the composition of any one of the above embodiments and any one or more of the further embodiments herein, wherein the anionic sulfonated surfactant comprises or consists of anionic sulfonated surfactant an represented by Formula I, Formula II, or Formula III, and wherein n represents an integer of 1.

In a further embodiment, the composition of any one of the above embodiments and any one or more of the further embodiments herein, wherein the anionic sulfonated surfactant comprises or consists of anionic sulfonated surfactant an represented by Formula IV.

In a further embodiment, the composition of any one of the above embodiments and any one or more of the further embodiments herein, wherein the anionic sulfonated surfactant comprises or consists of anionic sulfonated surfactant an represented by Formula IV, and wherein:
i) $R^1$ represents a linear or branched $C_4$-$C_8$ alkyl, a linear or branched $C_6$-$C_{10}$ alkyl, a linear or branched $C_8$-$C_{14}$ alkyl, a linear or branched $C_{12}$-$C_{16}$ alkyl, a linear or branched $C_{14}$-$C_{18}$ alkyl, a linear or branched $C_{16}$-$C_{20}$ alkyl, or a linear or branched $C_{18}$-$C_{24}$ alkyl; and
ii) $R^2$ represents a hydrogen.

In a further embodiment, the composition of any one of the above embodiments and any one or more of the further embodiments herein, wherein the anionic sulfonated surfactant comprises or consists of anionic sulfonated surfactant an represented by Formula IV, and wherein:
i) $R^1$ represents a linear or branched $C_6$ alkyl, a linear or branched $C_{10}$ alkyl, or a linear or branched $C_{12}$ alkyl; and
ii) $R^2$ represents a hydrogen.

In a further embodiment, the composition of any one of the above embodiments and any one or more of the further embodiments herein, wherein the anionic sulfonated surfactant comprises or consists of anionic sulfonated surfactant an represented by Formula IV, and wherein:
i) $R^1$ represents a hydrogen; and
ii) $R^2$ represents a linear or branched $C_4$-$C_8$ alkyl, a linear or branched $C_6$-$C_{10}$ alkyl, a linear or branched $C_8$-$C_{14}$ alkyl, a linear or branched $C_{12}$-$C_{16}$ alkyl, a linear or branched $C_{14}$-$C_{18}$ alkyl, a linear or branched $C_{16}$-$C_{20}$ alkyl, or a linear or branched Cis-$C_{24}$ alkyl.

In a further embodiment, the composition of any one of the above embodiments and any one or more of the further embodiments herein, wherein the anionic sulfonated surfactant comprises or consists of anionic sulfonated surfactant an represented by Formula IV, and wherein:
i) $R^1$ represents a hydrogen; and
ii) $R^2$ represents a linear or branched $C_6$ alkyl, a linear or branched $C_{10}$ alkyl, or a linear or branched $C_{12}$ alkyl.

In a further embodiment, the composition of any one of the above embodiments and any one or more of the further embodiments herein, wherein the anionic sulfonated surfactant comprises or consists of anionic sulfonated surfactant an represented by Formula IV, and wherein $R^1$ and $R^2$ independently represent a linear or branched $C_4$-$C_8$ alkyl, a linear or branched $C_6$-$C_{10}$ alkyl, a linear or branched $C_8$-$C_{14}$ alkyl, a linear or branched $C_{12}$-$C_{16}$ alkyl, a linear or branched $C_{14}$-$C_{18}$ alkyl, a linear or branched $C_{16}$-$C_{20}$ alkyl, or a linear or branched $C_{18}$-$C_{24}$ alkyl.

In a further embodiment, the composition of any one of the above embodiments and any one or more of the further embodiments herein, wherein the anionic sulfonated surfactant comprises or consists of anionic sulfonated surfactant an represented by Formula IV, and wherein $R^1$ and $R^2$ independently represents a linear or branched $C_6$ alkyl, a linear or branched $C_{10}$ alkyl, or a linear or branched $C_{12}$ alkyl.

In a further embodiment, the composition of any one of the above embodiments and any one or more of the further embodiments herein, wherein the anionic sulfonated surfactant comprises or consists of anionic sulfonated surfactant an represented by Formula I, Formula II, Formula III, or Formula IV, and wherein the moiety represented by $SO_3M$ is not $SO_3H$.

In a further embodiment, the composition of any one of the above embodiments and any one or more of the further embodiments herein, wherein the anionic sulfonated surfactant comprises or consists of anionic sulfonated surfactant an represented by Formula I, Formula II, Formula III, or Formula IV, and wherein M represents an alkali metal.

In a further embodiment, the composition of any one of the above embodiments and any one or more of the further embodiments herein, wherein the anionic sulfonated surfactant comprises or consists of anionic sulfonated surfactant an represented by Formula I, Formula II, Formula III, or Formula IV, and wherein M represents $N(R^4)_4$.

In a further embodiment, the composition of any one of the above embodiments and any one or more of the further embodiments herein, wherein the anionic sulfonated surfactant comprises or consists of anionic sulfonated surfactant an represented by Formula I, Formula II, Formula III, or Formula IV, and wherein at least one $R^4$ independently represents a hydrogen.

In a further embodiment, the composition of any one of the above embodiments and any one or more of the further embodiments herein, wherein the anionic sulfonated surfactant comprises or consists of anionic sulfonated surfactant an represented by Formula I, Formula II, Formula III, or Formula IV, and wherein at least one $R^4$ independently represents a linear or branched $C_3$ alkyl.

In a further embodiment, the composition of any one of the above embodiments and any one or more of the further embodiments herein, wherein the anionic sulfonated surfactant comprises or consists of anionic sulfonated surfactant an represented by Formula I, Formula II, Formula III, or Formula IV, and wherein at least one $R^4$ independently represents a linear or branched $C_4$ alkyl.

In a further embodiment, the composition of any one of the above embodiments and any one or more of the further embodiments herein, wherein the anionic sulfonated surfactant comprises or consists of anionic sulfonated surfactant an represented by Formula I, Formula II, Formula III, or Formula IV, and wherein at least one $R^4$ independently represents a linear or branched $C_5$ alkyl.

In a further embodiment, the composition of any one of the above embodiments and any one or more of the further embodiments herein, wherein the anionic sulfonated surfactant comprises or consists of anionic sulfonated surfactant an represented by Formula I, Formula II, Formula III, or Formula IV, and wherein at least one $R^4$ independently represents a linear or branched $C_6$ alkyl.

In a further embodiment, the composition of any one of the above embodiments and any one or more of the further embodiments herein, wherein the anionic sulfonated surfactant comprises or consists of anionic sulfonated surfactant an represented by Formula I, Formula II, Formula III, or Formula IV, and wherein M represents an aminoalcohol salt.

In a further embodiment, the composition of any one of the above embodiments and any one or more of the further embodiments herein, wherein at least one of the one or more star macromolecules is represented by Formula A:

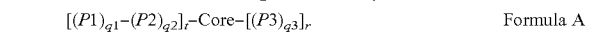

$$[(P1)_{q1}\text{-}(P2)_{q2}]_t\text{-Core-}[(P3)_{q3}]_r \qquad \text{Formula A}$$

wherein:
Core represents a crosslinked polymeric segment;
P1 represents a hydrophobic polymeric segment comprised of repeat units of monomeric residues of polymerized monomers;
P2 represents a hydrophilic polymeric segment comprised of repeat units of monomeric residues of polymerized monomers;
P3 represents a hydrophilic polymeric segment comprised of repeat units of monomeric residues of polymerized monomers;
q1 represents the number of repeat units in P1 and has a value between 1 and 50;
q2 represents the number of repeat units in P2 and has a value between 30 and 2000;
q3 represents the number of repeat units in P3 and has a value between 5 and 2000;
r represents the number of block copolymeric arms covalently attached to the Core;
t represents the number of polymeric arms covalently attached to the Core; and
wherein the molar ratio of r to t is in the range of between 40:1 and 2:1.

In a further embodiment, the composition of any one of the above embodiments and any one or more of the further embodiments herein, wherein at least one of the one or more star macromolecules is a surfactant-system thickening macromolecule.

In a further embodiment, the composition of any one of the above embodiments and any one or more of the further embodiments herein, wherein at least one of the one or more star macromolecules is a surfactant-system thickening macromolecule represented by Formula B:

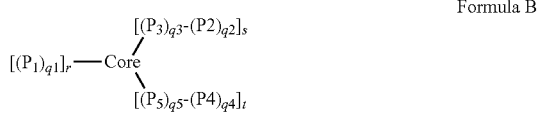

Formula B wherein:
Core represents a crosslinked polymeric segment;
P1 independently represents a polymeric segment of a first polymeric arm comprised of monomeric residues of polymerized hydrophilic monomers;
P2 independently represents a further segment of a second polymeric arm comprised of at least one monomeric residue of a polymerized hydrophobic monomer;
P3 independently represents a polymeric segment of the second polymeric arm comprised of monomeric residues of polymerized hydrophilic monomers;
P4 independently represents a polymeric segment of a third polymeric arm comprised of monomeric residues of polymerized hydrophobic monomers;
P5 independently represents a polymeric segment of the third polymeric arm comprised of monomeric residues of polymerized hydrophilic monomers;
q1 independently represents the number of monomeric residues in P1 and has a value between 5 and 2000;
q2 independently represents the number of monomeric residues in P2 and has a value between 1 and 500;
q3 independently represents the number of monomeric residues in P3 and has a value between 10 and 5000;
q4 independently represents the number of monomeric residues in P4 and has a value between 1 and 500;
q5 independently represents the number of monomeric residues in P5 and has a value between 10 and 5000;
r independently represents the number of the first polymeric arms covalently attached to the Core and has a value in the range of from 1 to 1000;
s independently represents the number of the second polymeric arms covalently attached to the Core and has a value in the range of from 1 to 1000;
t independently represents the number of the third polymeric arms covalently attached to the Core and has a value in the range of from 0 to 1000; and
wherein the ratio of r:s, and, if t is not zero, the ratio of r:t, t:s, and r:(s+t), are independently in the range of between 40:1 and 1:40.

While preferred embodiments of the present invention have been shown and described herein, it will be obvious to those skilled in the art that such embodiments are provided by way of example only. It is intended that the following claims define the scope of the invention and that methods and structures within the scope of these claims and their equivalents be covered thereby.

What is claimed is:
1. A composition comprising at least one sulfonated surfactant composition and one or more star macromolecules having a core and a plurality of polymeric arms, wherein:
a) at least one polymeric arm of the plurality of polymeric arms is a hydrophilic polymeric arm;
b) at least one polymeric arm of the plurality of polymeric arms is a copolymeric arm, wherein the at least one copolymeric arm:
1) comprises a longer hydrophilic segment proximal to the core and a shorter hydrophobic segment distal to the core; and
2) has a greater degree of polymerization than the at least one hydrophilic polymeric arm; and wherein the at least one sulfonated surfactant composition comprises a disulfonated surfactant composition represented by Formula II or Formula III:

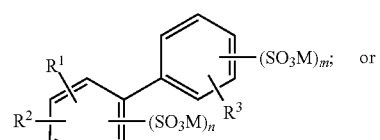

Formula II

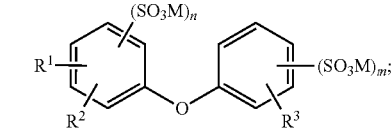

Formula III wherein:
$R^1$—represents a hydrogen, or a linear or branched $C_6$-$C_{24}$ alkyl;
$R^2$—represents a hydrogen, or a linear or branched $C_6$-$C_{24}$ alkyl;
$R^3$—represents a hydrogen, or a linear or branched $C_6$-$C_{24}$ alkyl;
M—represents an alkali metal, an ammonium represented by $N(R^4)_4$, or an aminoalcohol, or $SO_3M$ is $SO_3H$; wherein $R^4$ independently represents a hydrogen, or a linear or branched $C_3$-$C_6$ alkyl;
m—represents an integer of 1 or 2; and
n—represents an integer of 0 or 1; and
wherein at least one and no more than two of $R^1$, $R^2$, and $R^3$, represents a linear or branched $C_6$-$C_{24}$ alkyl.

2. The composition of claim 1, wherein the composition is a gel or a fluid.

3. The composition of claim 1, wherein the composition is used as an oilfield chemical.

4. The composition of claim 1, wherein the at least one sulfonated surfactant composition comprises any mixture of any number of the following: C10 (Linear) Sodium Diphenyl Oxide Disulfonate, C16 (Linear) Sodium Diphenyl Oxide Disulfonate, C6 (Linear) Diphenyl Oxide Disulfonic Acid, C12 (Branched) Sodium Diphenyl Oxide Disulfonate, C12 (Branched) Diphenyl Oxide Disulfonic Acid, and C12 (Branched) Diphenyl Oxide Disulfonic Acid.

5. The composition of claim 1, wherein when 1.0 wt. % of the star macromolecule and 0.3 wt. % of the at least one sulfonated surfactant composition forms a homogeneous gel and has a dynamic viscosity of at least 50 cP at a shear rate of 100 s$^{-1}$ at 75° F., according to the Surfactant with KCl Compatibility Test.

6. The composition of claim 1, wherein when 1.0 wt. % of the star macromolecule and 0.3 wt. % of the at least one sulfonated surfactant composition forms a homogeneous gel and has a dynamic viscosity of at least 50 cP at a shear rate of 100 s$^{-1}$ at 75° F., according to the Surfactant with KCl Compatibility Test, and has a Dynamic Viscosity at 200° F. that is at least 50% relative to the viscosity of the gel at 75° F., according to the Temperature Stability Test.

7. The composition of claim 1, wherein when 2.0 wt. % of the star macromolecule and 5.0 wt. % of the at least one sulfonated surfactant composition forms a homogeneous gel and has a dynamic viscosity of at least 30,000 cP in 5.0 wt. % sulfonated surfactant composition aqueous solution at a shear rate of 0.22 s$^{-1}$ at 25° C., according to the Surfactant Compatibility Test.

8. The composition of claim 1, wherein the at least one sulfonated surfactant composition comprises 2-100 wt. % of an anionic sulfonated surfactant.

9. The composition of claim 1, further comprising a chloride salt.

10. The composition of claim 9 has a salinity of about 2% or greater.

11. The composition of claim 1, wherein the moiety represented by $SO_3M$ is not $SO_3H$.

12. The composition of claim 1, wherein M represents an alkali metal.

13. The composition of claim 1, wherein M represents $N(R^4)_4$.

14. The composition of claim 13, wherein at least one $R^4$ independently represents a hydrogen.

15. The composition of claim 13, wherein at least one $R^4$ independently represents a linear or branched $C_3$-$C_6$ alkyl.

16. The composition of claim 1, wherein M represents an aminoalcohol salt.

17. The composition of claim 1, wherein at least one of the one or more star macromolecules is represented by Formula A:

  Formula A wherein:
Core represents a crosslinked polymeric segment;
P1 represents a hydrophobic polymeric segment comprised of repeat units of monomeric residues of polymerized monomers;
P2 represents a hydrophilic polymeric segment comprised of repeat units of monomeric residues of polymerized monomers;
P3 represents a hydrophilic polymeric segment comprised of repeat units of monomeric residues of polymerized monomers;
q1 represents the number of repeat units in P1 and has a value between 1 and 50;
q2 represents the number of repeat units in P2 and has a value between 30 and 2000;
q3 represents the number of repeat units in P3 and has a value between 5 and 2000;
r represents the number of block copolymeric arms covalently attached to the Core;
t represents the number of polymeric arms covalently attached to the Core; and wherein the molar ratio of r to t is in the range of between 40:1 and 2:1.

18. The composition of claim 1, wherein at least one of the one or more star macromolecules is a surfactant-system thickening macromolecule.

19. The composition of claim 1, wherein at least one of the one or more star macromolecules is a surfactant-system thickening macromolecule represented by Formula B:

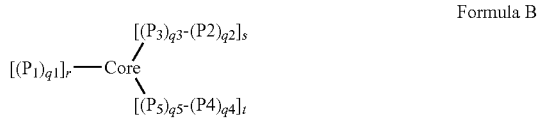  Formula B wherein:
Core represents a crosslinked polymeric segment;
P1 independently represents a polymeric segment of a first polymeric arm comprised of monomeric residues of polymerized hydrophilic monomers;
P2 independently represents a further segment of a second polymeric arm comprised of at least one monomeric residue of a polymerized hydrophobic monomer;
P3 independently represents a polymeric segment of the second polymeric arm comprised of monomeric residues of polymerized hydrophilic monomers;
P4 independently represents a polymeric segment of a third polymeric arm comprised of monomeric residues of polymerized hydrophobic monomers;
P5 independently represents a polymeric segment of the third polymeric arm comprised of monomeric residues of polymerized hydrophilic monomers;
q1 independently represents the number of monomeric residues in P1 and has a value between 5 and 2000;
q2 independently represents the number of monomeric residues in P2 and has a value between 1 and 500;
q3 independently represents the number of monomeric residues in P3 and has a value between 10 and 5000;
q4 independently represents the number of monomeric residues in P4 and has a value between 1 and 500;
q5 independently represents the number of monomeric residues in P5 and has a value between 0 and 5000;
r independently represents the number of the first polymeric arms covalently attached to the Core and has a value in the range of from 1 to 1000;
s independently represents the number of the second polymeric arms covalently attached to the Core and has a value in the range of from 1 to 1000;
t independently represents the number of the third polymeric arms covalently attached to the Core and has a value in the range of from 0 to 1000; and
wherein the ratio of r:s, and, if t is not zero, the ratio of r:t, t:s, and r:(s+t), are independently in the range of between 40:1 and 1:40.

* * * * *